US012382089B2

(12) United States Patent
Ruiz Coll et al.

(10) Patent No.: US 12,382,089 B2
(45) Date of Patent: Aug. 5, 2025

(54) ADAPTIVE REORDERING OF ADJUSTED BLOCK VECTOR PREDICTOR CANDIDATES

(71) Applicant: Ofinno, LLC, Reston, VA (US)

(72) Inventors: Damian Ruiz Coll, Reston, VA (US); Alexey Konstantinovich Filippov, Khimki (RU); Vasily Alexeevich Rufitskiy, Vladimir (RU); Tae Meon Bae, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/093,632

(22) Filed: Jan. 5, 2023

(65) Prior Publication Data

US 2023/0217037 A1    Jul. 6, 2023

Related U.S. Application Data

(60) Provisional application No. 63/296,753, filed on Jan. 5, 2022.

(51) Int. Cl.
*H04N 19/52* (2014.01)
*H04N 19/105* (2014.01)
*H04N 19/159* (2014.01)
*H04N 19/176* (2014.01)

(52) U.S. Cl.
CPC .......... *H04N 19/52* (2014.11); *H04N 19/105* (2014.11); *H04N 19/159* (2014.11); *H04N 19/176* (2014.11)

(58) Field of Classification Search
CPC .. H04N 19/105; H04N 19/159; H04N 19/176; H04N 19/52; H04N 19/57; H04N 19/593
See application file for complete search history.

(56) References Cited

U.S. PATENT DOCUMENTS

| | | | |
|---|---|---|---|
| 2015/0271515 A1 | 9/2015 | Pang et al. | |
| 2017/0223379 A1* | 8/2017 | Chuang | ................ H04N 19/513 |
| 2019/0281303 A1 | 9/2019 | Xu et al. | |
| 2020/0021835 A1 | 1/2020 | Xu et al. | |

(Continued)

OTHER PUBLICATIONS

Han Gao et al., "Decoder Side Motion Vector Refinement for Versatile Video Coding", 2019 IEEE 21st International Workshop on Multimedia Signal Processing (MMSP), 2019, pp. 1-6.

(Continued)

*Primary Examiner* — Shahan Ur Rahaman
(74) *Attorney, Agent, or Firm* — Shan He; Kavon Nasabzadeh; Jacob L. Mangan

(57) ABSTRACT

An apparatus determines a value of a coordinate of a sample is outside a range of values of the coordinate for samples in an intra block copy (IBC) reference region. The sample is displaced from a current block by an amount indicated by a candidate block vector predictor (BVP). Based on determining the value of the coordinate of the sample is outside the range of value of the coordinate for the samples in the IBC reference region, the apparatus adjusts a component of the candidate BVP to generate an adjusted candidate BVP. The apparatus constructs a list of candidate BVPs comprising the adjusted candidate BVP. The apparatus derives costs for the candidate BVPs in the list. The apparatus reorders the candidate BVPs in the list based on the costs.

17 Claims, 26 Drawing Sheets

(56) References Cited

U.S. PATENT DOCUMENTS

| | | | |
|---|---|---|---|
| 2020/0084453 A1* | 3/2020 | Xu | H04N 19/52 |
| 2020/0288120 A1* | 9/2020 | Xu | H04N 19/44 |
| 2020/0404287 A1* | 12/2020 | Xu | H04N 19/174 |
| 2021/0250580 A1* | 8/2021 | Chen | H04N 19/105 |
| 2022/0109852 A1 | 4/2022 | Xu et al. | |
| 2022/0159295 A1* | 5/2022 | Xiu | H04N 19/567 |
| 2022/0182638 A1* | 6/2022 | Xu | H04N 19/1883 |
| 2022/0368916 A1* | 11/2022 | Zhang | H04N 19/109 |
| 2023/0217013 A1* | 7/2023 | Nien | H04N 19/593 375/240.12 |

OTHER PUBLICATIONS

Xiaozhong Xu et al., "Intra block Versatile Video Coding with Reference Sample Memory Reuse", 2019 Picture Coding Symposium (PCS), 2019, pp. 1-5.

Wei-Jung Chien et al., "Motion Vector Coding and Block Merging in Versatile Video Coding Standard", IEEE Transactions on Circuits and Systems for Video Technology, vol. 31, No. 10, Oct. 2021, pp. 3848-3861.

Tung Nguyen et al., "Overview of the Screen Content Support in VVC: Applications, Coding Tools, and Performance", IEEE Transactions on Circuits and Systems for Video Technology PP(99):1-1, Apr. 2021, pp. 1-18.

International Telecommunication Union, ITU-T, Telecommunication Standardization Sector of ITU, H.266, (Aug. 2020), Series H: Audiovisual and Multimedia Systems, Infrastructure of audiovisual services—Coding of moving video, Versatile video coding.

JVET-L0159r1; Joint Video Experts Team (JVET) of ITU-T SG 16 WP 3 and ISO/IEC JTC 1/SC 29/WG 11; 12th Meeting: Macau, CN, Oct. 8-12, 2018; Non-CE8: Title: Block vector predictor for IBC; Source: LG Electronics Inc.

JVET-N0382v2; Joint Video Experts Team (JVET) of ITU-T SG 16 WP 3 and ISO/IEC JTC 1/SC 29/WG 11; 14th Meeting: Geneva, CH, Mar. 19-27, 2019; CE8-related: Title: Unified intra block copy block vector prediction; Source: Tencent.

JVET-N0457; Joint Video Experts Team (JVET) of ITU-T SG 16 WP 3 and ISO/IEC JTC 1/SC 29/WG 11; 14th Meeting: Geneva, CH, Mar. 19-27, 2019; Title: CE8-1.1: Block vector prediction for IBC; Source: LG Electronics Inc.

JVET-N0460; Joint Video Experts Team (JVET) of ITU-T SG 16 WP 3 and ISO/IEC JTC 1/SC 29/WG 11; 14th Meeting: Geneva, CH, Mar. 19-27, 2019; Title: CE8-related: Default candidates for IBC merge mode; Source: LG Electronics Inc.

JVET-O0078-v3; Joint Video Experts Team (JVET) of ITU-T SG 16 WP 3 and ISO/IEC JTC 1/SC 29/WG 11; 15th Meeting: Gothenburg, SE, Jul. 3-12, 2019; Title: CE8-1.7: Single HMVP table for all CUs inside the shared merge list region for IBC; Source: Peking University, SZ DJI Technology Co., Ltd., Bytedance Inc., Tencent.

JVET-P0400; Joint Video Experts Team (JVET) of ITU-T SG 16 WP 3 and ISO/IEC JTC 1/SC 29/WG 11; 16th Meeting: Geneva, CH, Oct. 1-11, 2019; Title: AhG16/Non-CE8: Removal of shared merge list; Source: Bytedance Inc.

JVET-P0457-v2; Joint Video Experts Team (JVET) of ITU-T SG 16 WP 3 and ISO/IEC JTC 1/SC 29/WG 11; 16th Meeting: Geneva, CH, Oct. 1-11, 2019; Title: Non-CE8: On IBC merge list size signaling; Source: Tencent.

JVET-Q0327-v4; Joint Video Experts Team (JVET) of ITU-T SG 16 WP 3 and ISO/IEC JTC 1/SC 29/WG 11; 17th Meeting: Brussels, BE, Jan. 7-17, 2020; Title: On IBC/ATMVP candidate list construction; Source: SZ DJI Technology Co., Ltd., Peking University.

JVET-T2002-v2; Joint Video Experts Team (JVET) of ITU-T SG 16 WP 3 and ISO/IEC JTC 1/SC 29; 20th Meeting, by teleconference, Oct. 7-16, 2020; Title: Algorithm description for Versatile Video Coding and Test Model 11 (VTM 11); Source: Editors.

JVET-X0089; Joint Video Experts Team (JVET) of ITU-T SG 16 WP 3 and ISO/IEC JTC 1/SC 29; 24th Meeting, by teleconference, Oct. 6-15, 2021; Title: Non-EE2: Modifications of IBC Merge/AMVP List Construction; Source: Bytedance Inc.

JVET-Y0160; Joint Video Experts Team (JVET) of ITU-T SG 16 WP 3 and ISO/IEC JTC 1/SC 29; 25th Meeting, by teleconference, Jan. 12-21, 2022; Title: EE2-3.13-related: Enlarged HMVP table for IBC; Source: Bytedance Inc.

Final Office Action mailed Sep. 11, 2024 in U.S. Appl. No. 17/954,762.

* cited by examiner

The quick brown fox jumps over the lazy dog. The quick brown fox jumps over the lazy dog. The quick brown fox jumps over the lazy dog.

*FIG. 16*

ADAPTIVE REORDERING OF ADJUSTED BLOCK VECTOR PREDICTOR CANDIDATES

CROSS-REFERENCE TO RELATED APPLICATIONS

This application claims the benefit of U.S. Provisional Application No. 63/296,753, filed 5 Jan. 2022, which is hereby incorporated by reference in its entirety.

BRIEF DESCRIPTION OF THE DRAWINGS

Examples of several of the various embodiments of the present disclosure are described herein with reference to the drawings.

FIG. 16 illustrates an example of IBC applied for screen content in accordance with embodiments of the present disclosure.

DETAILED DESCRIPTION

Figure 1:
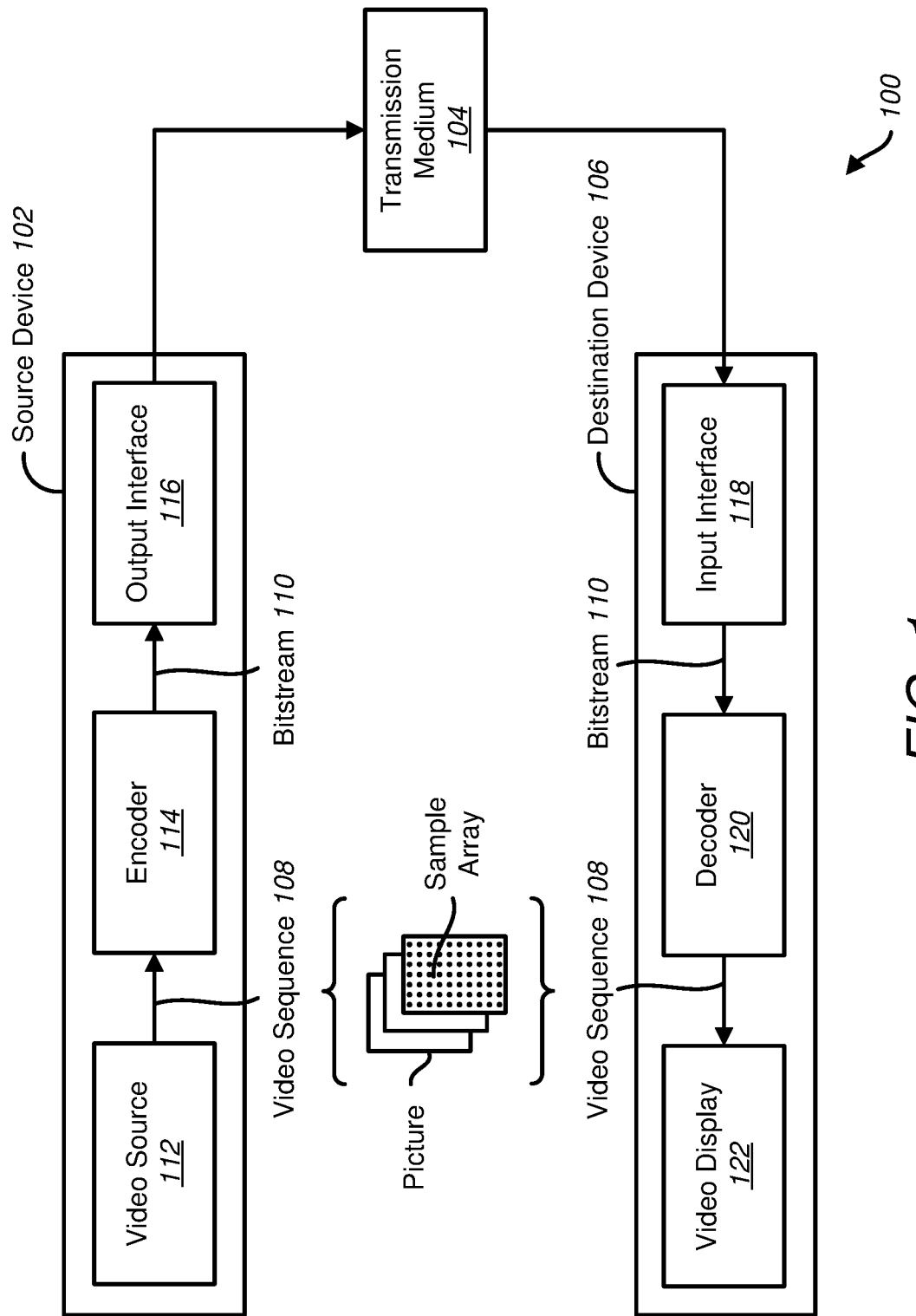
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bitstream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in bitstream 110 and determine the prediction errors using transform coefficients also received in bitstream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
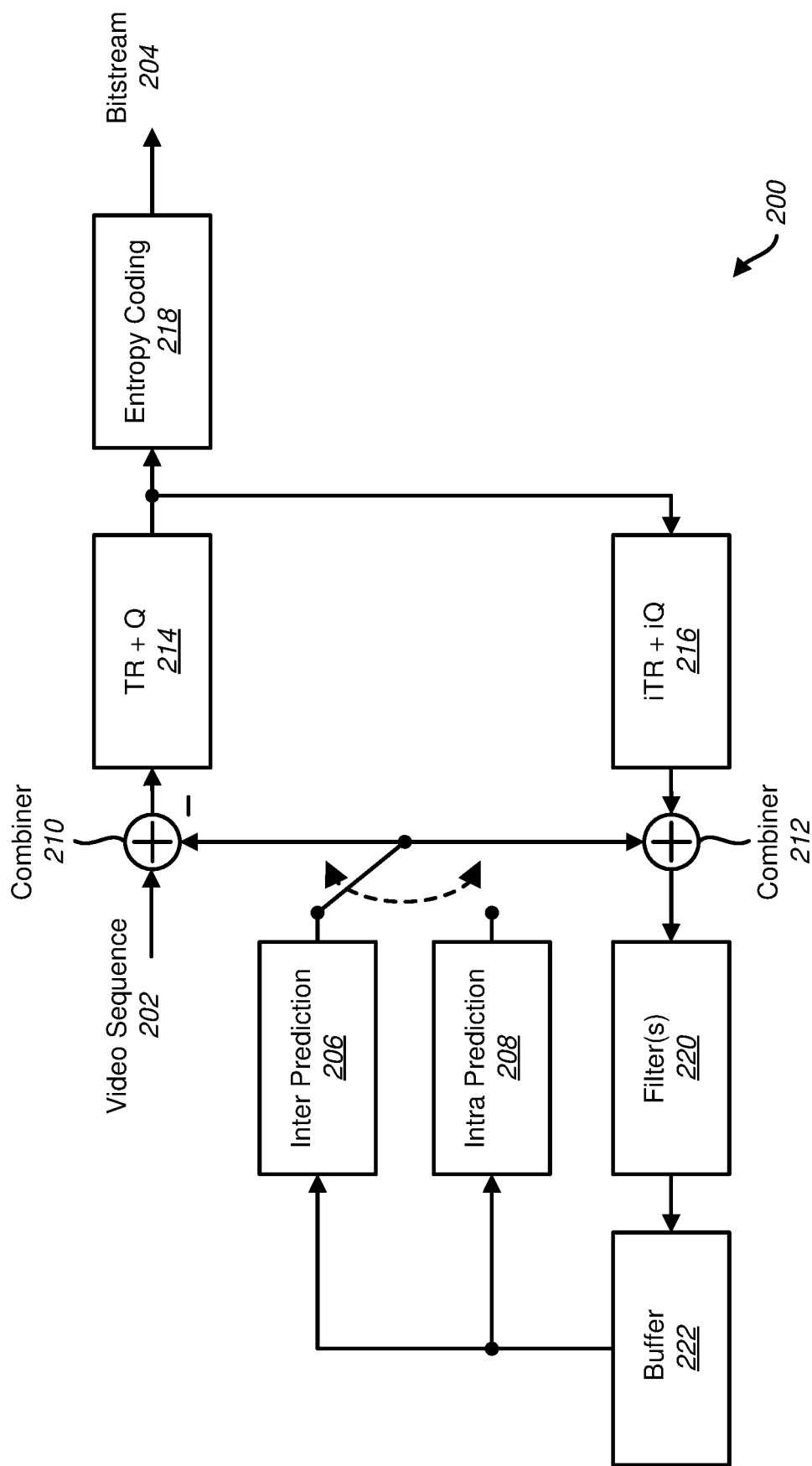
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
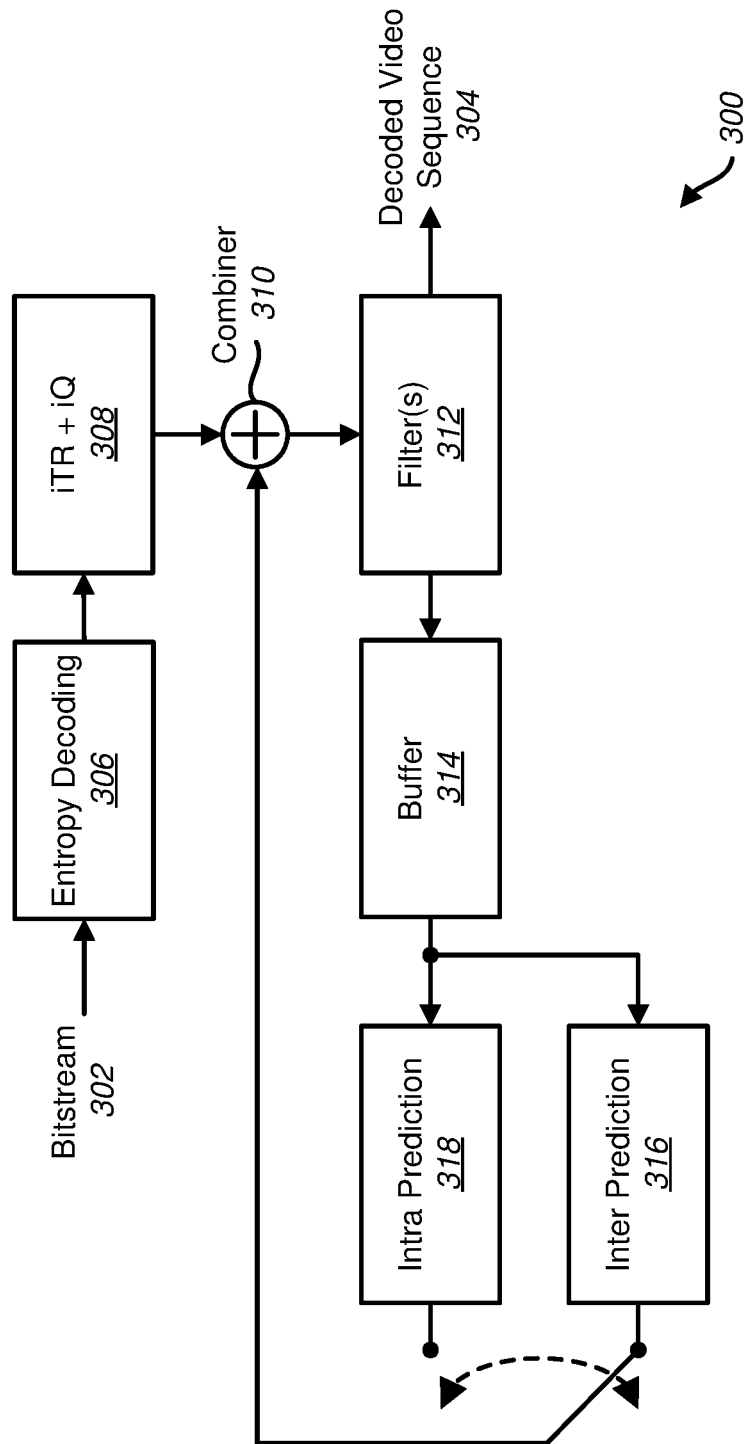
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTB s), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
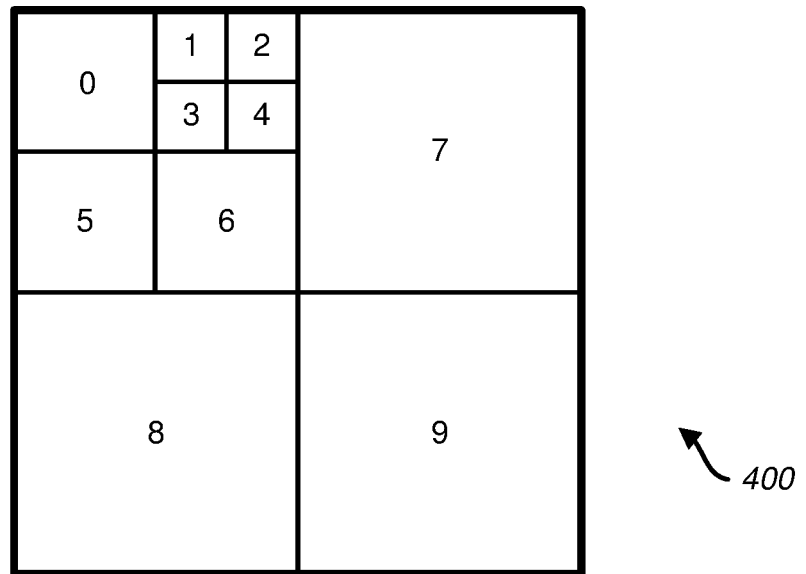
FIG. 4 illustrates an example quadtree partitioning of a coding tree block (CTB) in accordance with embodiments of the present disclosure.
Figure 5:
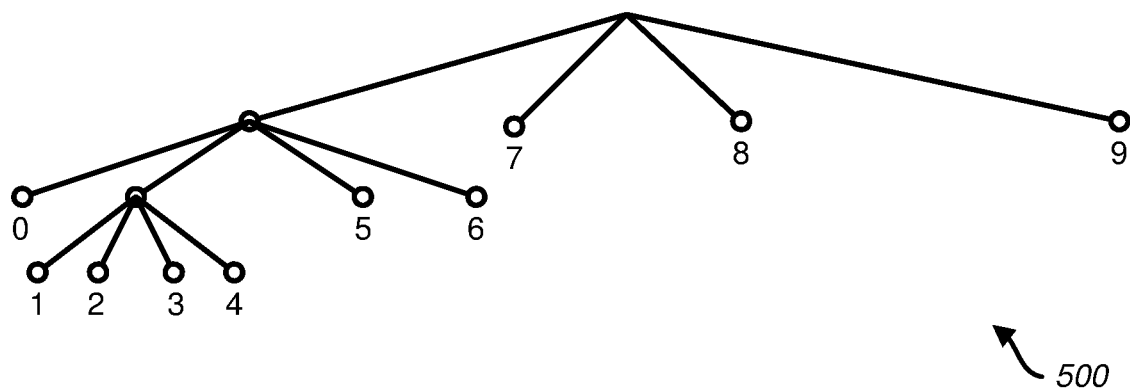
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
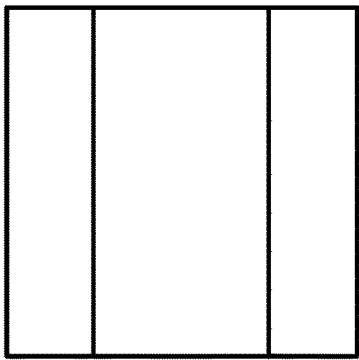
FIG. 6 illustrates example binary and ternary tree partitions in accordance with embodiments of the present disclosure.
Figure 6:
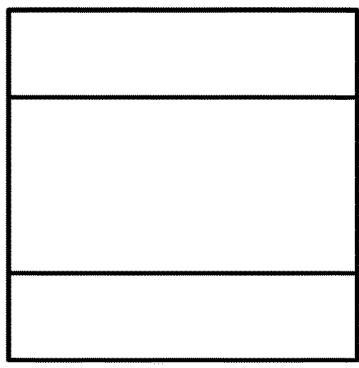
Figure 6:
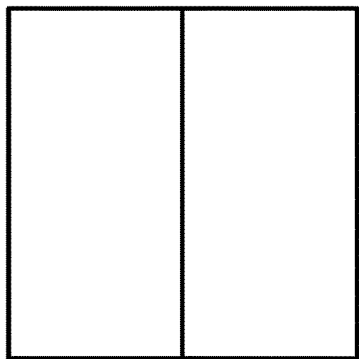
Figure 6:
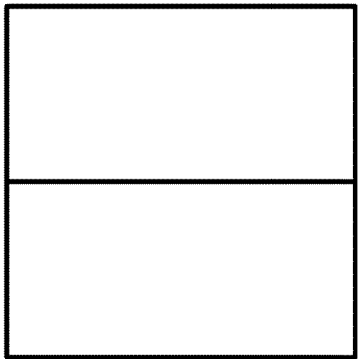

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
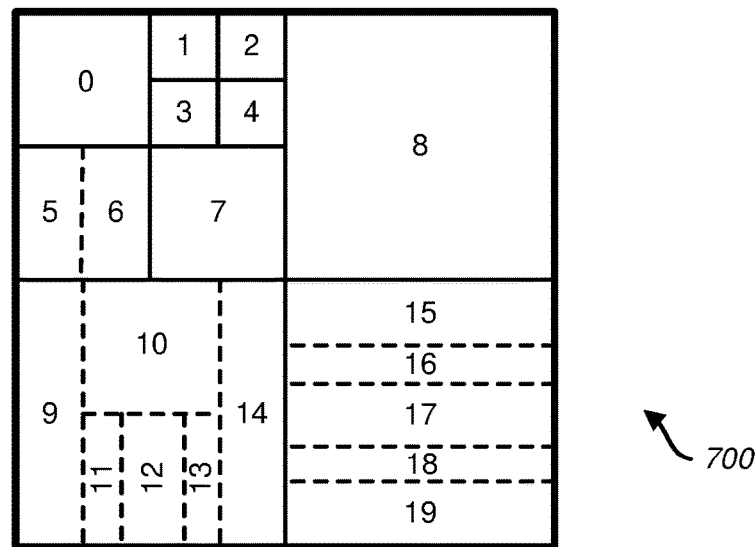
FIG. 7 illustrates an example quadtree+multi-type tree partitioning of a CTB in accordance with embodiments of the present disclosure.
Figure 8:
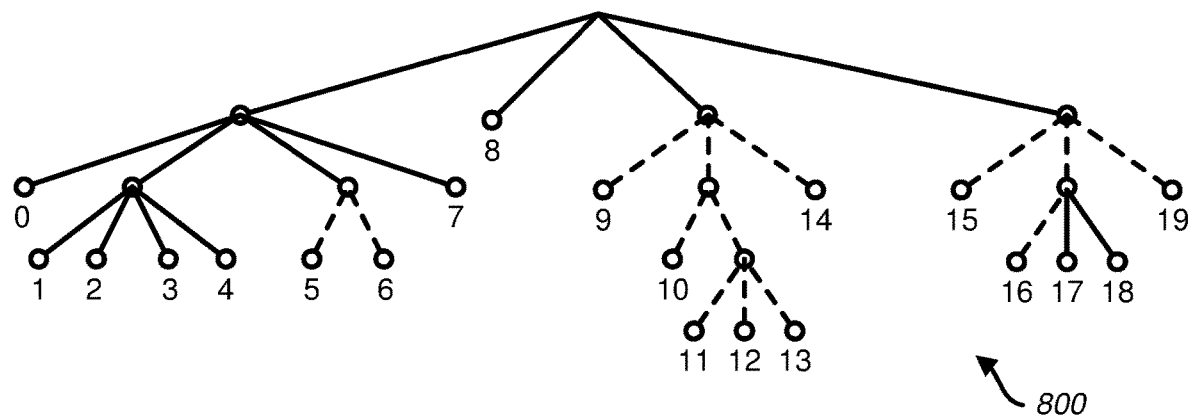
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
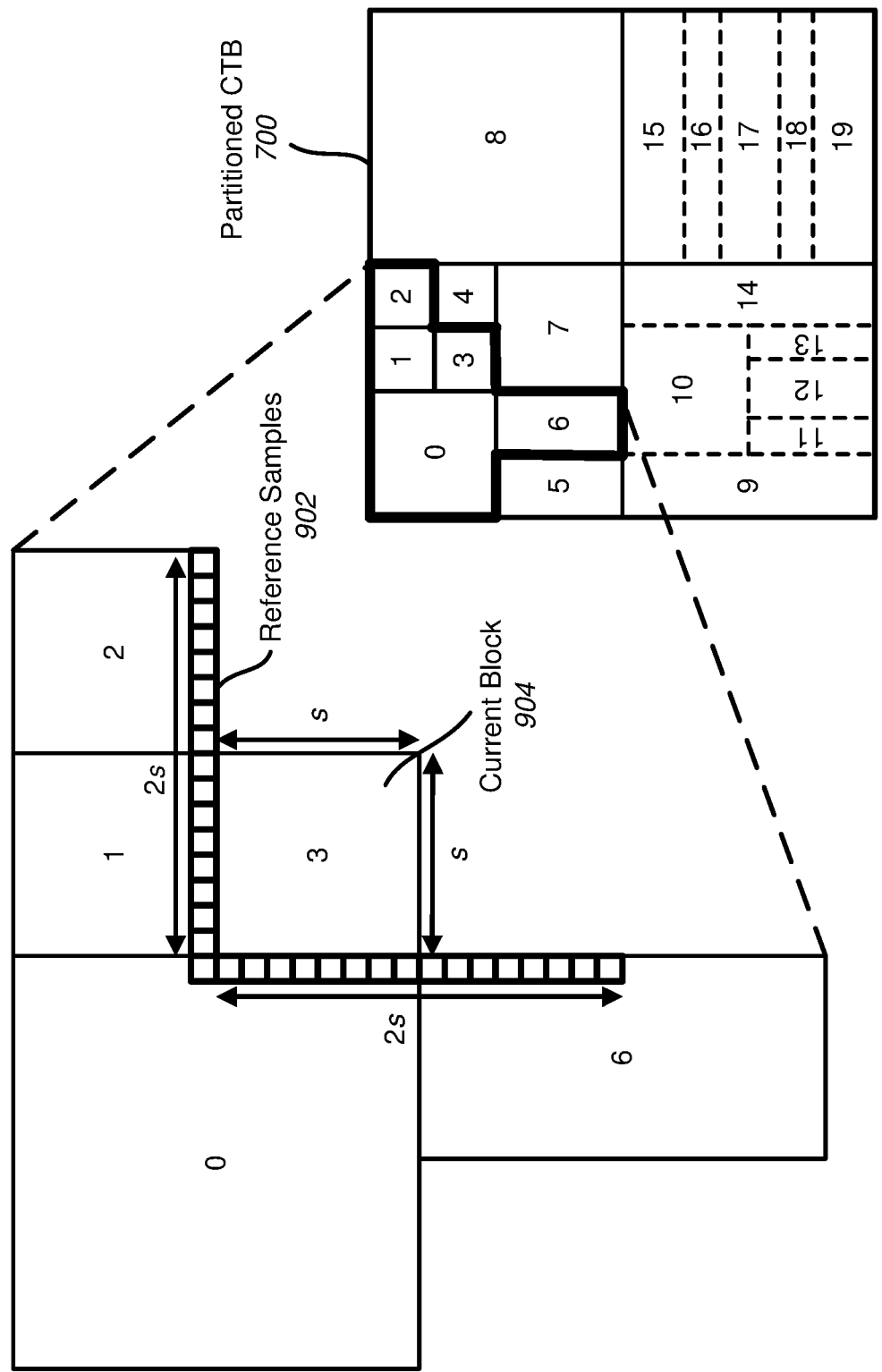
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
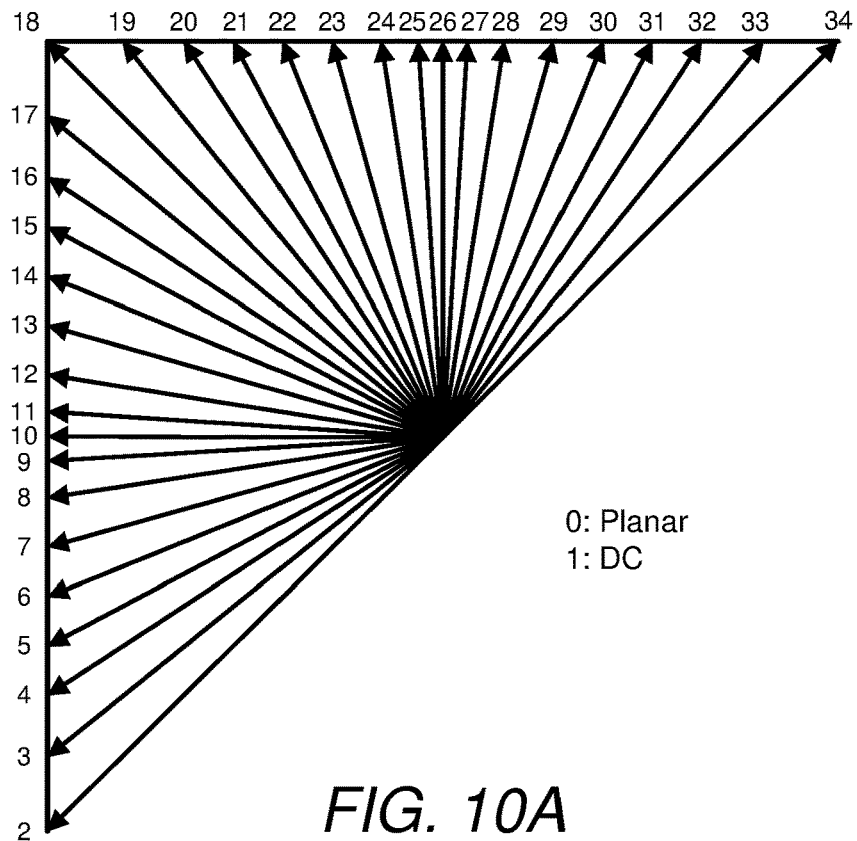
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
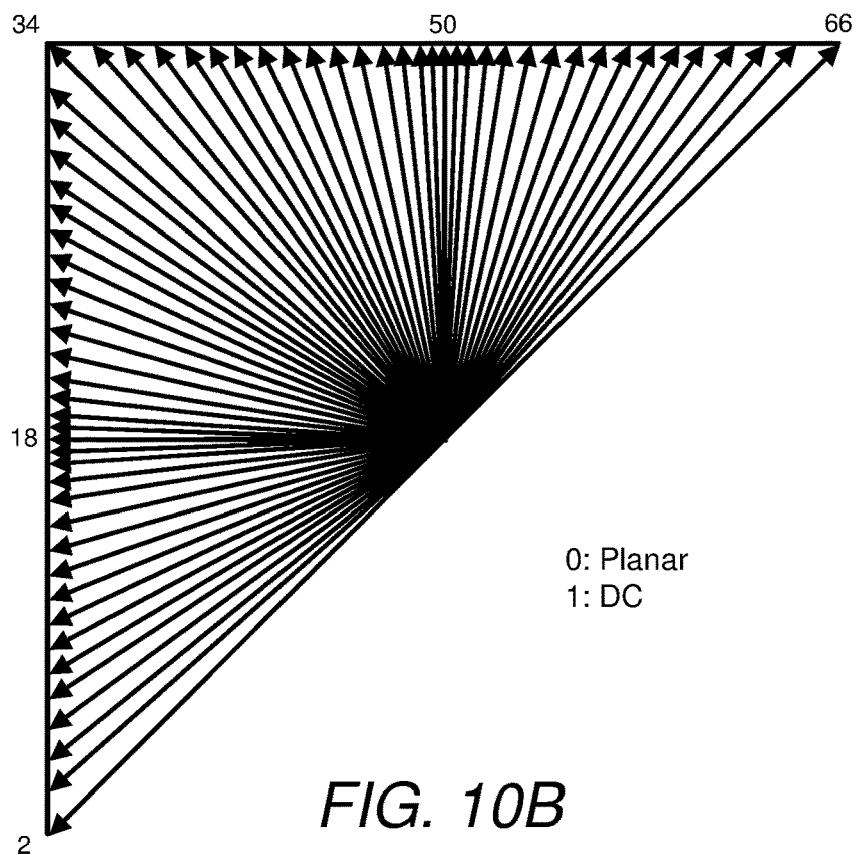
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
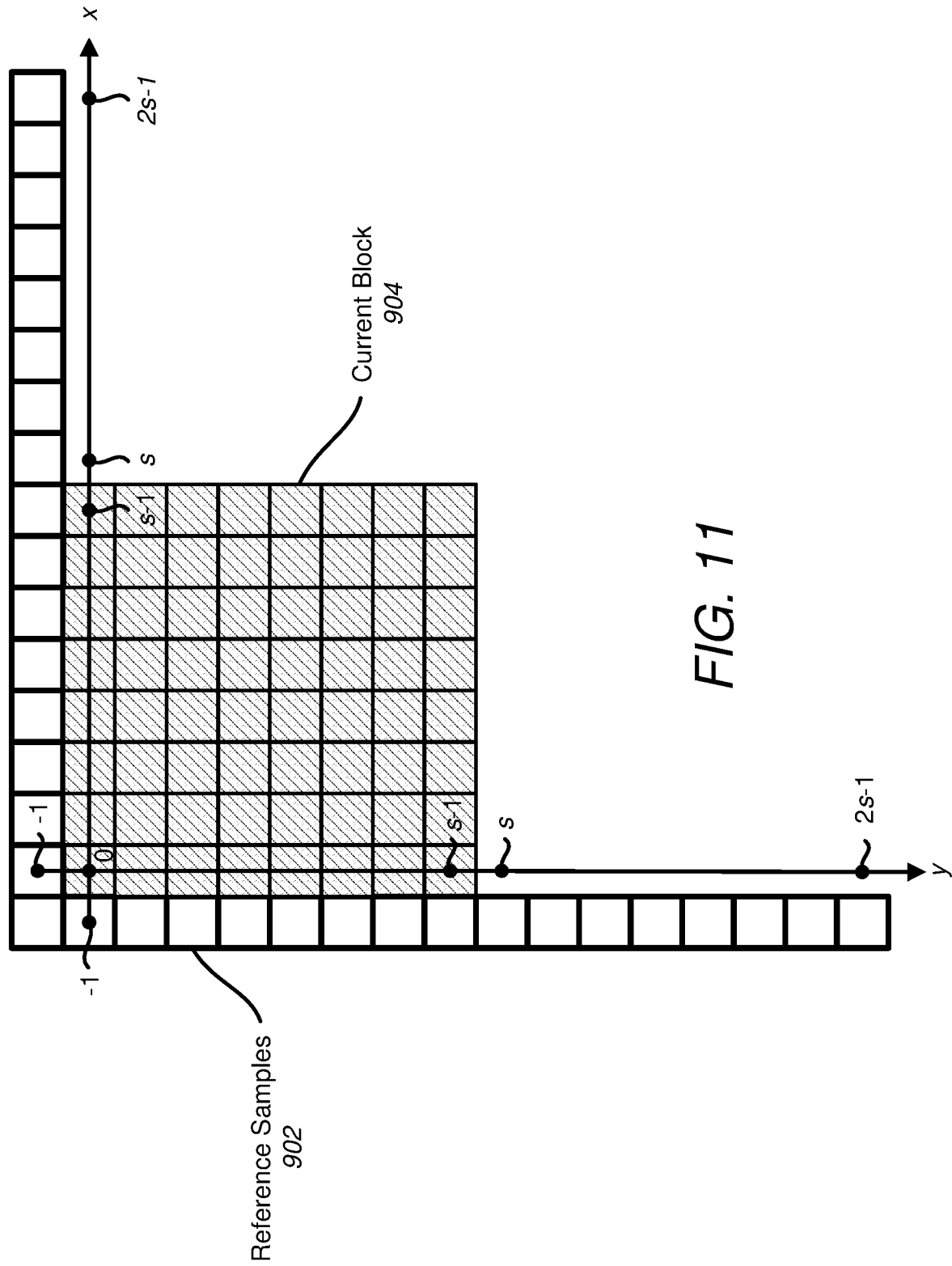
FIG. 11 illustrates the current block and reference samples from FIG. 9 in a two-dimensional x, y plane in accordance with embodiments of the present disclosure.
Figure 12:
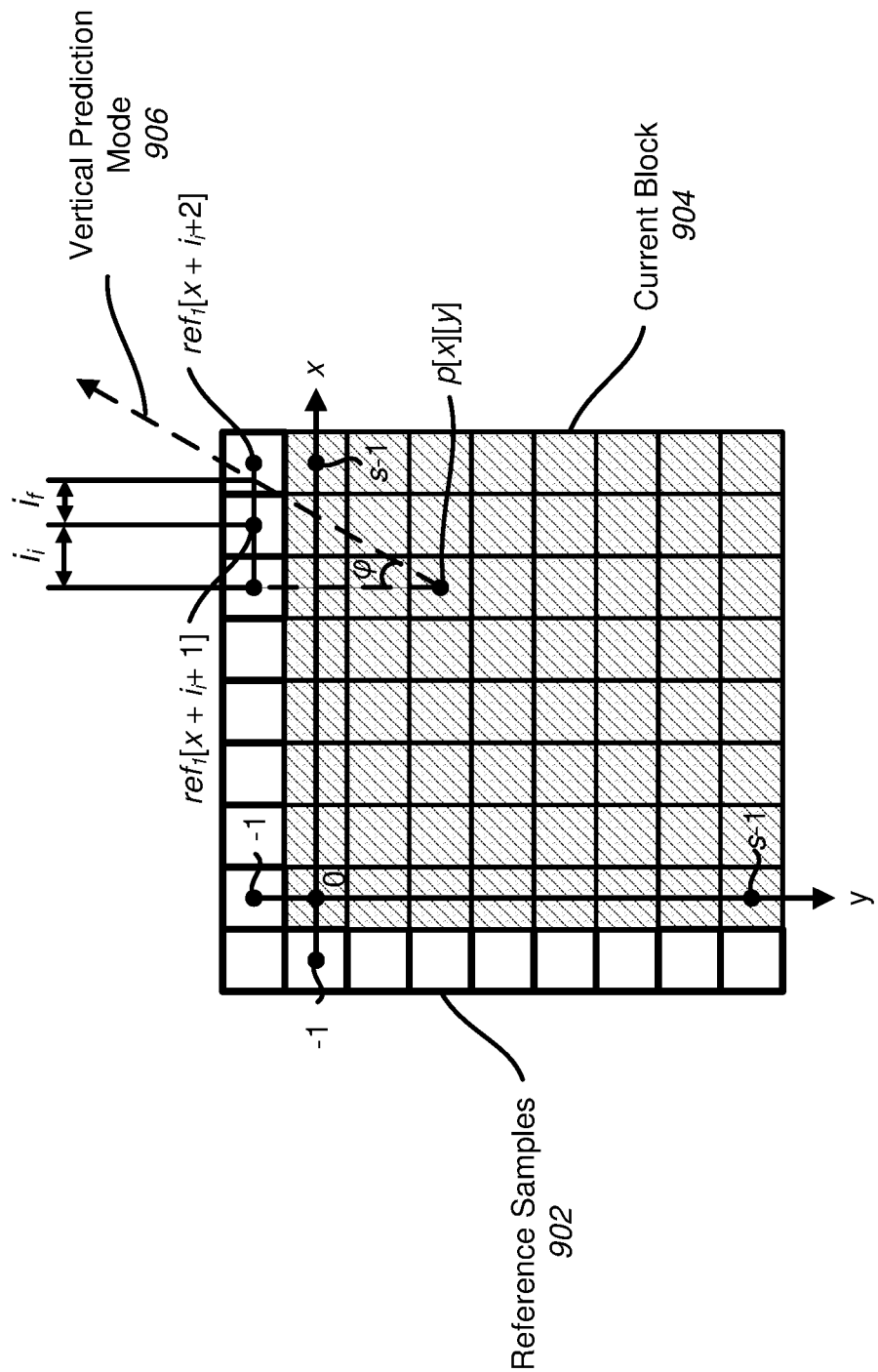
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane, where a sample may be referenced as p[x][y]. In order to simplify the prediction process, reference samples 902 may be placed in two, one-dimensional arrays. Reference samples 902 above current block 904 may be placed in the one-dimensional array $ref_1[x]$:

$$ref_1[x]=p[-1+x][-1], (x \geq 0) \quad (1)$$

Reference samples 902 to the left of current block 904 may be placed in the one-dimensional array $ref_2[x]$:

$$ref_2[y]=p[-1][-1+y], (y \geq 0) \quad (2)$$

For planar mode, a sample at location [x][y] in current block 904 may be predicted by calculating the mean of two interpolated values. The first of the two interpolated values may be based on a horizontal linear interpolation at location [x][y] in current block 904. The second of the two interpolated values may be based on a vertical linear interpolation at location [x][y] in current block 904. The predicted sample p[x][y] in current block 904 may be calculated as $$p[x][y] = \frac{1}{2 \cdot s}(h[x][y] + v[x][y] + s) \quad (3)$$

where $$h[x][y]=(s-x-1)\cdot ref_2[y]+(x+1)\cdot ref_1[s] \quad (4)$$

may be the horizontal linear interpolation at location [x][y] in current block 904 and $$v[x][y]=(s-y-1)\cdot ref_1[x]+(y+1)\cdot ref_2[s] \quad (5)$$

may be the vertical linear interpolation at location [x][y] in current block 904.

For DC mode, a sample at location [x][y] in current block 904 may be predicted by the mean of the reference samples 902. The predicted value sample p[x][y] in current block 904 may be calculated as $$p[x][y] = \frac{1}{2 \cdot s}\left(\sum_{x=0}^{s-1} ref_1[x] + \sum_{y=0}^{s-1} ref_2[y]\right) \quad (6)$$

For angular modes, a sample at location [x][y] in current block 904 may be predicted by projecting the location [x][y] in a direction specified by a given angular mode to a point on the horizontal or vertical line of samples comprising reference samples 902. The sample at location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a prediction of a sample at location [x][y] in current block 904 for a vertical prediction mode 906 given by an angle φ. For vertical prediction modes, the location [x][y] in current block 904 is projected to a point (referred to herein as the "projection point") on the horizontal line of reference samples $ref_1[x]$. Reference samples 902 are only partially shown in FIG. 12 for ease of illustration. Because the projection point falls at a fractional sample position between two reference samples in the example of FIG. 12, the predicted sample p[x][y] in current block 904 may be calculated by linearly interpolating between the two reference samples as follows $$p[x][y]=(1-i_f)\cdot ref_1[x+i_i+1]+i_f\cdot ref_1[x+i_i+2] \quad (7)$$

where $i_i$ is the integer part of the horizontal displacement of the projection point relative to the location [x][y] and may calculated as a function of the tangent of the angle φ of the vertical prediction mode 906 as follows $$i_i=\lfloor(y+1)\cdot\tan\varphi\rfloor, \quad (8)$$

and $i_f$ is the fractional part of the horizontal displacement of the projection point relative to the location [x][y] and may be calculated as $$i_f=(y+1)\cdot\tan\varphi-\lfloor(y+1)\cdot\tan\varphi\rfloor. \quad (9)$$

where $\lfloor\cdot\rfloor$ is the integer floor.

For horizontal prediction modes, the position [x][y] of a sample in current block 904 may be projected onto the vertical line of reference samples ref$_2$[y]. Sample prediction for horizontal prediction modes is given by:

$$p[x][y]=(1-i_f)\cdot\text{ref}_2[y+i_i+1]+i_f\cdot\text{ref}_2[y+i_i+2] \quad (10)$$

where $i_i$ is the integer part of the vertical displacement of the projection point relative to the location [x][y] and may be calculated as a function of the tangent of the angle φ of the horizontal prediction mode as follows $$i_i=\lfloor(x+1)\cdot\tan\varphi\rfloor, \quad (11)$$

and $i_f$ is the fractional part of the vertical displacement of the projection point relative to the location [x][y] and may be calculated as $$i_f=((x+1)\cdot\tan\varphi)-\lfloor(x+1)\cdot\tan\varphi\rfloor. \quad (12)$$

where $\lfloor\cdot\rfloor$ is the integer floor.

The interpolation functions of (7) and (10) may be implemented by an encoder or decoder, such as encoder 200 in FIG. 2 or decoder 300 in FIG. 3, as a set of two-tap finite impulse response (FIR) filters. The coefficients of the two-tap FIR filters may be respectively given by $(1-i_f)$ and $i_f$. In the above angular intra prediction examples, the predicted sample p[x][y] may be calculated with some predefined level of sample accuracy, such as 1/32 sample accuracy. For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

In an embodiment, the two-tap interpolation FIR filter may be used for predicting chroma samples. For luma samples, a different interpolation technique may be used. For example, for luma samples a four-tap FIR filter may be used to determine a predicted value of a luma sample. For example, the four tap FIR filter may have coefficients determined based on $i_f$, similar to the two-tap FIR filter. For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. The value of the predicted sample p[x][y], for vertical prediction modes, may be determined based on the four-tap FIR filter as follows:

$$p[x][y] = \sum_{i=0}^{3} fT[i]*ref[x+iIdx+i] \quad (13)$$

where ft[i], i=0 . . . 3, are the filter coefficients. The value of the predicted sample p[x][y], for horizontal prediction modes, may be determined based on the four-tap FIR filter as follows:

$$p[x][y] = \sum_{i=0}^{3} fT[i]*ref[y+iIdx+i]. \quad (14)$$

It should be noted that supplementary reference samples may be constructed for the case where the position [x][y] of a sample in current block 904 to be predicted is projected to a negative x coordinate, which happens with negative vertical prediction angles φ. The supplementary reference samples may be constructed by projecting the reference samples in ref$_2$ [y] in the vertical line of reference samples 902 to the horizontal line of reference samples 902 using the negative vertical prediction angle φ. Supplemental reference samples may be similarly for the case where the position [x][y] of a sample in current block 904 to be predicted is projected to a negative y coordinate, which happens with negative horizontal prediction angles φ. The supplementary reference samples may be constructed by projecting the reference samples in ref$_1$[x] on the horizontal line of reference samples 902 to the vertical line of reference samples 902 using the negative horizontal prediction angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Similar to an encoder, a decoder may predict the samples of a current block being decoded, such as current block 904, for an intra prediction modes as explained above. For example, the decoder may receive an indication of an angular intra prediction mode from an encoder for a block. The decoder may construct a set of reference samples and perform intra prediction based on the angular intra prediction mode indicated by the encoder for the block in a similar manner as discussed above for the encoder. The decoder would add the predicted values of the samples of the block to a residual of the block to reconstruct the block. In another embodiment, the decoder may not receive an indication of an angular intra prediction mode from an encoder for a block. Instead, the decoder may determine an intra prediction mode through other, decoder-side means.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
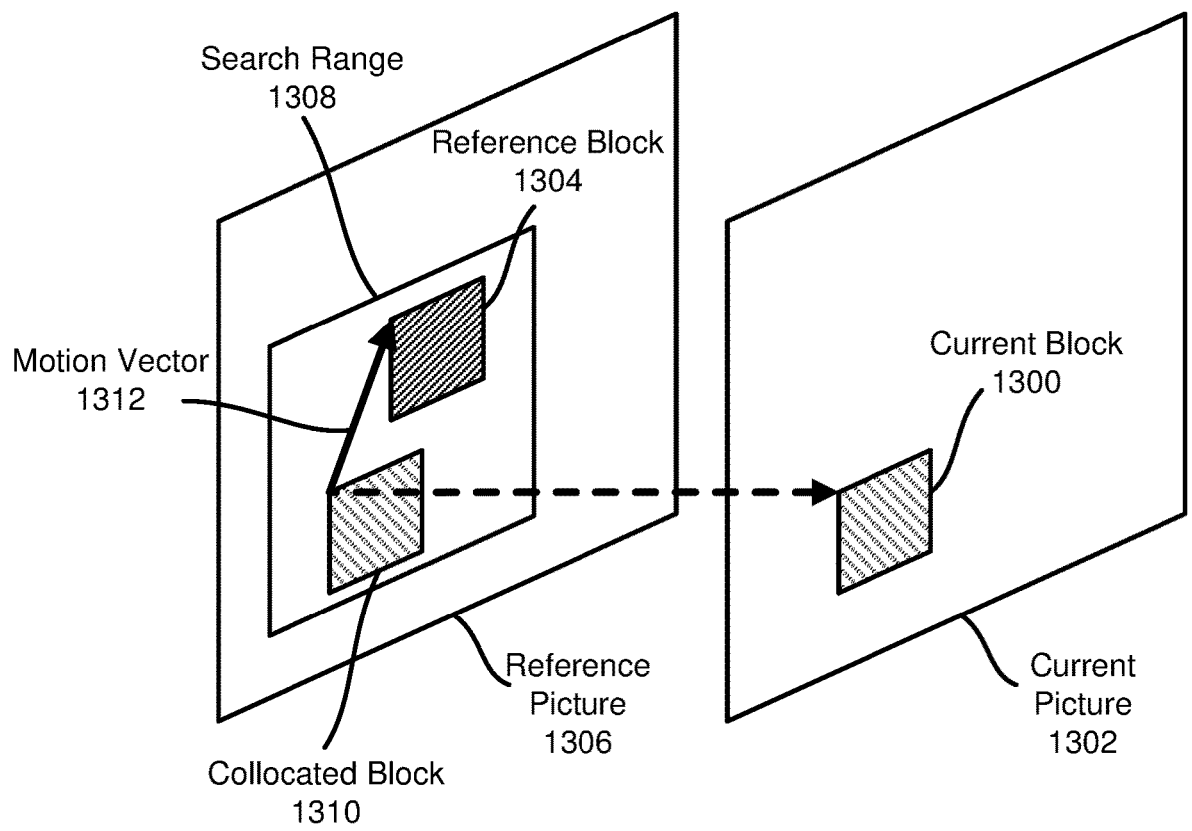
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a "best matching" reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD)) between the prediction samples of reference block 1304 and the original samples of current block 1300.

The encoder may search for reference block 1304 within a reference region 1308. Reference region 1308 may be positioned around the collocated position (or block) 1310 of current block 1300 in reference picture 1306. In some instances, reference region 1308 may at least partially extend outside of reference picture 1306. When extending outside of reference picture 1306, constant boundary extension may be used such that the values of the samples in the row or column of reference picture 1306, immediately adjacent to the portion of reference region 1308 extending outside of reference picture 1306, are used for the "sample" locations outside of reference picture 1306. All or a subset of potential positions within reference region 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
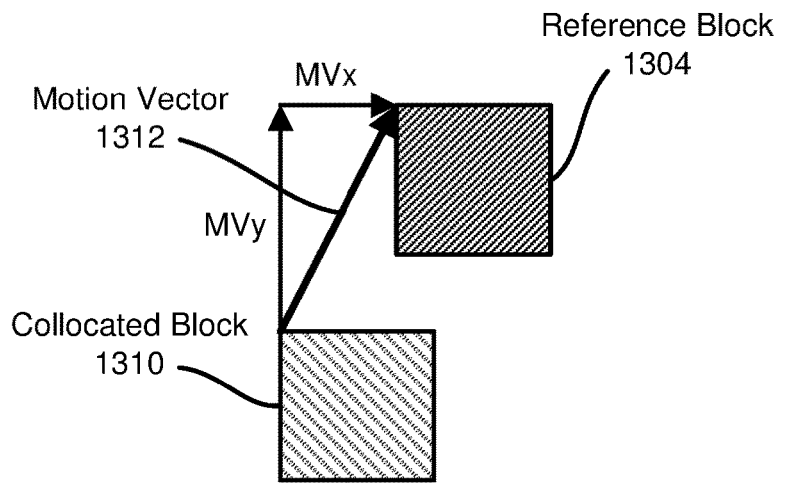
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component ($MV_x$) and a vertical component ($MV_y$) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, 1/16, or 1/32 fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
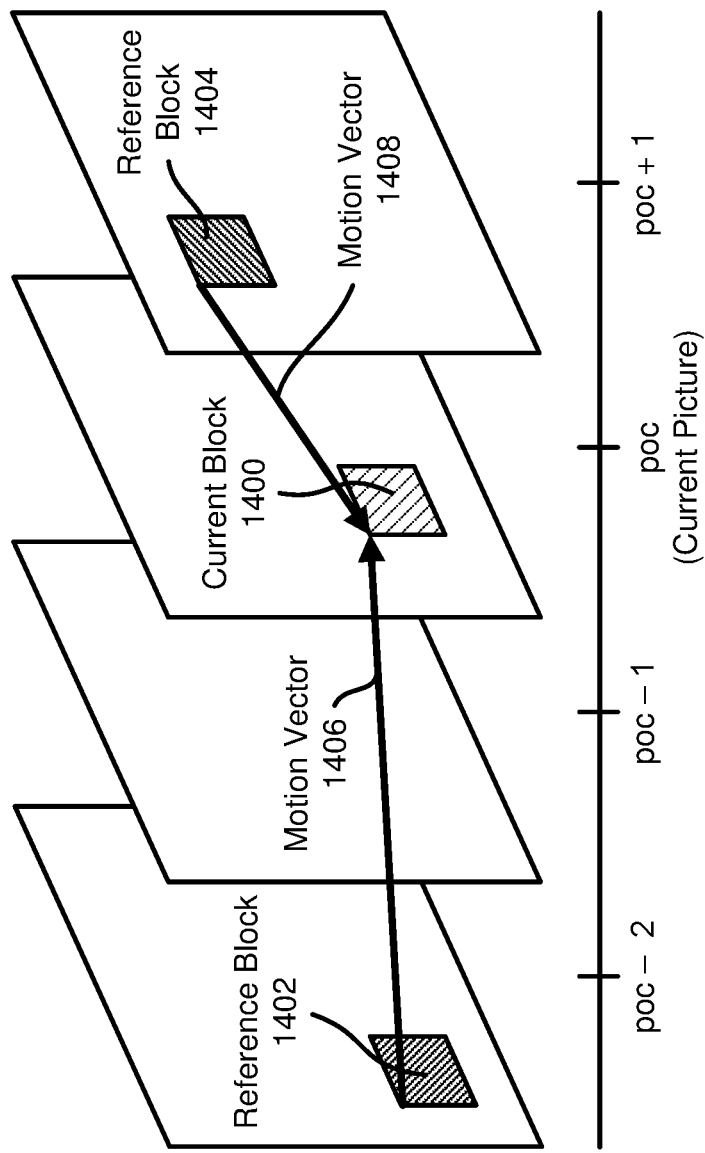
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list comprising reference picture 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list comprising reference picture 1404. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and VVC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component ($MV_x$) and a vertical displacement ($MV_y$) relative to the position of the current block being coded, the MVD may be represented by two components calculated as follows:

$$MVD_x = MV_x - MVP_x \qquad (15)$$

$$MVD_y = MV_y - MVP_y \qquad (16)$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
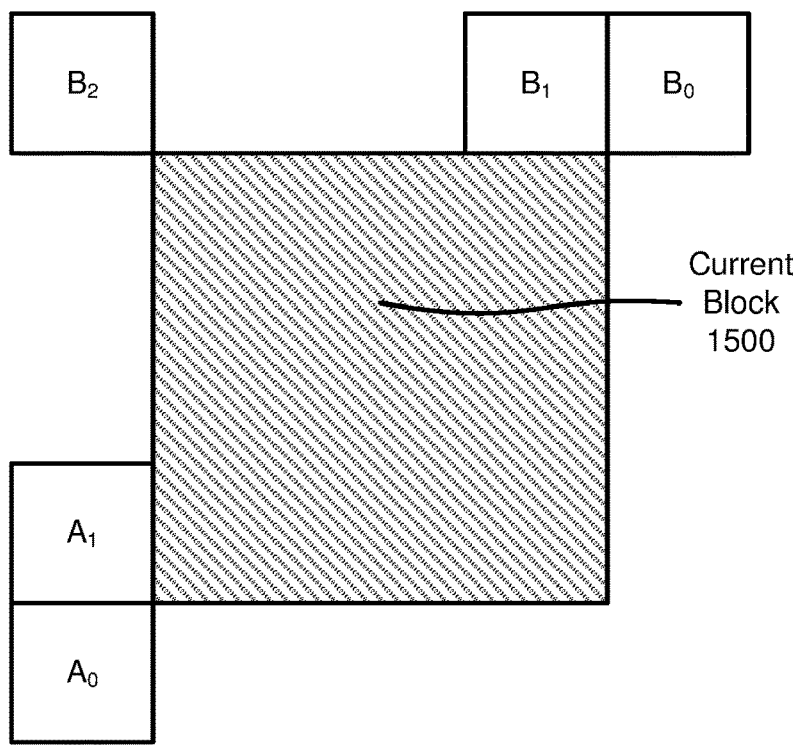
FIG. 15A illustrates an example location of five spatial candidate neighboring blocks relative to a current block being coded in accordance with embodiments of the present disclosure.
Figure 15B:
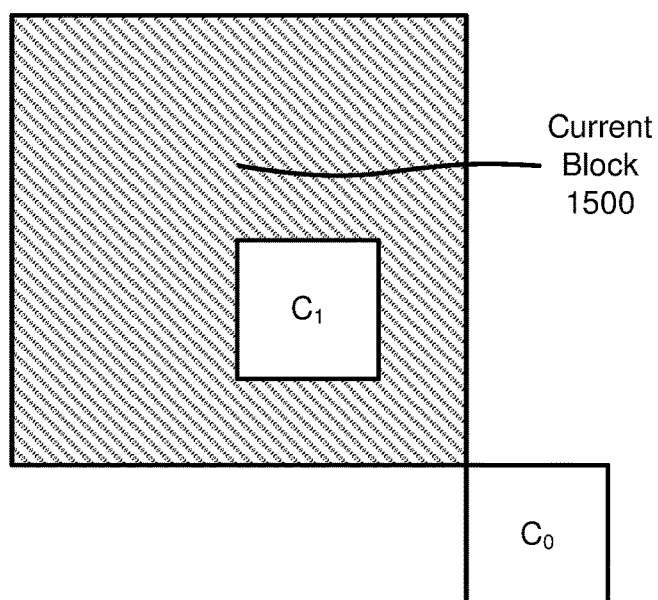
FIG. 15B illustrates an example location of two temporal, co-located blocks relative to a current block being coded in accordance with embodiments of the present disclosure.

In HEVC and VVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and VVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and VVC, it will be understood that the techniques of the present disclosure described above and further below may be applied to other inter prediction modes, including those of other video coding standards like VP8, VP9, AV1, and the like. In addition, history based motion vector prediction (HMVP), combined intra/inter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

HEVC and VVC both include a prediction technique to exploit the correlation between blocks of samples within the same picture of screen content video. This technique is referred to as intra block (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding or simply AMVP.

For BV prediction and difference coding or AMVP, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate, determine, or construct the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \quad (17)$$

$$BVD_y = BV_y - BVP_y \quad (18)$$

where $BVD_x$ and $BVD_y$ respectively represent the horizontal and vertical components of the BVD, and $BVP_x$ and $BVP_y$ respectively represent the horizontal and vertical components of the BVP. A decoder, such as decoder 300 in FIG. 3, may decode the BV by adding the BVD to the BVP indicated in the bitstream. The decoder may generate, determine, or construct the list of candidate BVPs in the same manner as the encoder. The BVP may be indicated in the bitstream to the decoder in the form of an index into the list pointing to the BVP. The decoder may then decode the current block by determining and/or generating the reference block, which forms the prediction of the current block, using the decoded BV and combining the prediction with the prediction error.

In HEVC, VVC, and other implementations, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC may be the same as those shown in FIG. 15A for inter prediction. The five spatial candidate neighboring blocks are respectively denoted $A_0$, $A_1$, $B_0$, $B_1$, and $B_2$. In other examples, the list of candidate BVPs for BV prediction and difference coding or AMVP may comprise different BVP candidates.

An encoder, such as encoder 200 in FIG. 2, may further code a BV using merge mode as explained above. Using merge mode, the encoder may reuse the same BV of a neighboring block for IBC prediction of a current block. Because the same BV of a neighboring block is used, no BVD needs to be signaled and the signaling overhead for signaling the BV of the current block may be small in size Similar to BV prediction and difference coding or AMVP for IBC, both the encoder and decoder may generate a candidate list of BVPs from neighboring blocks of the current block for the merge mode. The encoder may then determine to use (or inherit) the BV of one neighboring block's BV in the candidate list for predicting the BV information of the current block being coded. The encoder may signal, in the bit stream, an indication of the determined BVP from the candidate list. For example, the encoder may signal an index pointing into the list of candidate BVPs to indicate the determined BV. The decoder may generate, determine, or construct the list of candidate BVPs in the same manner as the encoder for the merge mode. The BVP may be indicated in the bitstream to the decoder in the form of an index into the list pointing to the BVP. The decoder may then decode the current block by determining and/or generating the reference block, which forms the prediction of the current block, using the determined BV and combining the prediction with the prediction error.

In HEVC, VVC, and other implementations, the list of candidate BVPs for merge mode may comprise up to four spatial merge candidates that are derived from the five spatial neighboring blocks used in AMVP for IBC, one temporal merge candidate derived from two temporal, co-located blocks used in AMVP for IBC, and one or more additional merge candidates including zero motion vector candidates. In other examples, the list of candidate BVPs for merge mode may comprise different BVP candidates.

In existing technologies, a BV for a current block coded using IBC may be constrained to indicate a relative displacement from the current block to a reference block within an IBC reference region. However, a BVP used to predicatively code a BV may not be similarly constrained. This is because a BVP may be derived from a BV of a spatially neighboring block of the current block or a prior coded BV as explained above. Because the BVP used to predicatively code a BV may not be constrained to indicate a relative displacement from a current block to a reference block within an IBC reference region like the BV, the BVP may not accurately predict the BV. This may potentially increase the number of bits needed to transmit a BVD between the BV and BVP for AMVP or prevent the BVP from being used altogether for merge mode.

Embodiments of the present disclosure are directed to apparatuses and methods for adjusting a BVP to provide a more accurate prediction of a BV determined using an IBC mode. Embodiments of the present disclosure may determine whether a coordinate (e.g., a horizontal or vertical coordinate) of a sample, displaced relative to a current block by an amount indicated by the BVP, is outside a range of values of the coordinate for samples in a reference region for the current block. Based on this determination, embodiments may adjust a length of a component, corresponding to the coordinate, of the BVP to have a value equal or closer to a length of a distance from the current block to a bound of the range of values of the coordinate for the samples in the reference region. Embodiments may then use the adjusted BVP to determine or predict the BV. These and other features of the present disclosure are described further below.

Figure 17:
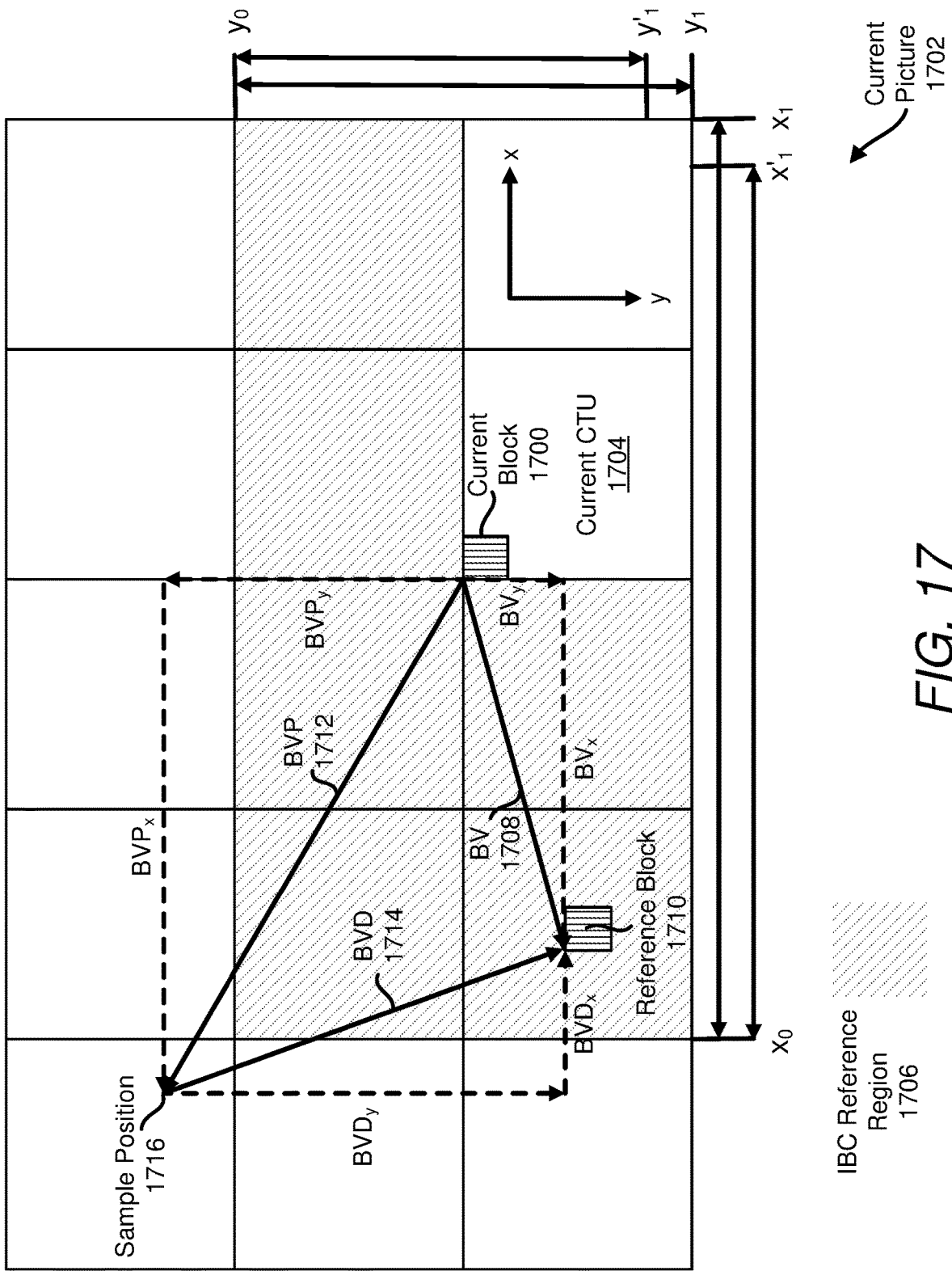
FIG. 17 illustrates an example IBC coding in accordance with embodiments of the present disclosure.

FIG. 17 illustrates an example IBC coding in accordance with embodiments of the present disclosure. In FIG. 17, an encoder, such as encoder 200 in FIG. 2, uses an IBC mode to code a current block 1700 in a current picture (or portion of a current picture) 1702. Current block 1700 may be a prediction block (PB) or coding block (CB) within a coding tree unit (CTU) 1704. Unlike inter prediction that searches for a reference block in a prior decoded picture that is different than the picture of the current block being encoded, IBC searches for a reference block in the same, current picture as the current block. As a result, only part of the current picture may be available for searching for a reference block in IBC. For example, only the part of the current picture that has been decoded prior to the encoding of the current block. This may ensure the encoding and decoding systems can produce identical results but also limits the IBC reference region.

In HEVC, VVC, and other video compression standards and implementations, blocks may be scanned from left-to-right, top-to-bottom using a z-scan to form the sequence order for encoding/decoding. Based on the z-scan, CTUs (represented by the large, square tiles in FIG. 17) to the left and in the row immediately above current CTU 1704 may be encoded/decoded prior to current CTU 1704 and current block 1700. Therefore, the samples of these CTUs (shown with hatching in FIG. 17) may form an exemplary IBC reference region 1706 for determining a reference block to predict current block 1700. In other video encoders and decoders, a different sequence order for encoding/decoding may be used, which may influence IBC reference region 1706 accordingly.

In addition to the encoding/decoding sequence order, one or more additional reference region constraints may be placed on IBC reference region 1706. For example, IBC reference region 1706 may be constrained based on slices, a limited memory for storing reference samples or to CTUs based on a parallel processing approach, like tiles or wavefront parallel processing (WPP). Tiles may be used as part of a picture partitioning process for flexibly subdividing a picture into rectangular regions of CTUs such that coding dependencies between CTUs of different tiles are not allowed. WPP may be similarly used as part of a picture partitioning process for partitioning a picture into CTU rows such that dependencies between CTUs of different partitions are not allowed. Each of these tools may enable parallel processing of the picture partitions. The CTUs in the left column and top row shown in FIG. 17 may not be part of IBC reference region 1706 due to a limited memory for storing reference samples and/or due to one of the parallel processing approaches.

The encoder may apply a block matching technique to determine a block vector (BV) 1708 that indicates the relative displacement from current block 1700 to a reference block 1710 (or intra block compensated prediction) within IBC reference region 1706 that "best matches" current block 1700. IBC reference region 1706 is a constraint placed on BV 1708. BV 1708 is constrained by IBC reference region 1706 to indicate a displacement from current block 1700 to a reference block that is within IBC reference region 1706. The encoder may determine the best matching reference block from blocks tested, within IBC reference region 1706, during a searching process. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. Reference block 1710 may comprise decoded (or reconstructed) samples of current picture 1702 prior to being processed by in-loop filtering operations, like deblocking or SAO filtering.

Once reference block 1710 is determined and/or generated for current block 1700 using IBC, the encoder may determine or use a difference (e.g., a corresponding sample-by-sample difference) between current block 1700 and reference block 1710. The difference may be referred to as a prediction error or residual. The encoder may then store and/or signal in a bitstream the prediction error and the related prediction information for decoding.

The prediction information may include BV 1708. In other instances, the prediction information may include an indication of BV 1708. For example, in HEVC, VVC, and other video compression schemes, BV 1708 may be predictively coded before being stored or signaled in a bit stream as explained previously above. BV 1708 for current block 1700 may be predictively coded using BV prediction and difference coding (also referred to as AMVP) or merge mode for IBC as explained above.

For the BV prediction and difference coding technique or AMVP, the encoder may code BV 1708 as a difference between BV 1708 and a BV predictor (BVP) 1712. The encoder may select BVP 1712 from a list of candidate BVPs. The candidate BVPs may come from previously decoded BVs of neighboring blocks of current block 1700 or from other sources as explained above. Both the encoder and decoder may generate or determine the list of candidate BVPs. After the encoder selects BVP 1712 from the list of candidate BVPs, the encoder may determine a BV difference (BVD) 1714. BVD 1714 may be calculated based on the difference between BV 1708 and BVP 1712. For example, BVD 1714 may be represented by two directional components calculated according to equations (17) and (18) above, which are reproduced below:

$$BVD_x = BVx - BVP_x \qquad (17)$$

$$BVD_y = BVy - BVP_y \qquad (18)$$

where $BVD_x$ and $BVD_y$ respectively represent the horizontal and vertical components of BVD 1714, $BV_x$ and $BV_y$ respectively represent the horizontal and vertical components of BV 1708, and $BVP_x$ and $BVP_y$ respectively represent the horizontal and vertical components of BVP 1712. The horizontal x-axis and vertical y-axis are indicated in the lower right hand corner of current picture 1702 for reference purposes.

The encoder may signal, in a bit stream, the prediction error, an indication of the selected BVP 1712 (e.g., via an index pointing into the list of candidate BVPs), and the separate components of BVD 1714 given by equations (17) and (18). A decoder, such as decoder 300 in FIG. 3, may decode BV 1708 by adding corresponding components of BVD 1714 to corresponding components of BVP 1712. The decoder may then decode current block 1700 by determining and/or generating reference block 1710, which forms the prediction of current block 1700, using the decoded BV and combining the prediction with the prediction error received in the bitstream.

Using merge mode, the encoder may reuse the same BV of a neighboring block for IBC prediction of a current block. Because the same BV of a neighboring block is used, no BVD needs to be signaled and the signaling overhead for signaling the BV of current block 1700 may be small in size. Similar to BV prediction and difference coding or AMVP for IBC, both the encoder and decoder may generate a candidate list of BVPs from neighboring blocks of current block 1700. The encoder may then determine to use (or inherit) the BV of one neighboring block's BV in the candidate list for predicting the BV information of the current block being coded. The encoder may signal, in the bit stream, an indication of the determined BVP 1712 from the candidate list. For example, the encoder may signal an index pointing into the list of candidate BVPs to indicate the determined BVP 1712. In HEVC, VVC, and other implementations, the list of candidate BVPs for merge mode may comprise up to four spatial merge candidates that are derived from the five spatial neighboring blocks used in AMVP for IBC, one temporal merge candidate derived from two temporal, co-located blocks used in AMVP for IBC, and one or more additional merge candidates including zero motion vector candidates.

As can be seen from FIG. 17, BVP 1712 indicates a relative displacement from a position of current block 1700 to a sample position 1716. The position of current block 1700 may be determined by the position of the top left sample of current block 1700. Sample position 1716 may be an integer sample position or a fractional sample position between two, integer sample positions. Because BVP 1712 may be derived from spatially neighboring blocks of current block 1700 and/or prior coded BVs, sample position 1716 indicated by BVP 1712 may be outside IBC reference region 1706, which is the case shown in FIG. 17. BV 1708, on the other hand, may be constrained to indicate a relative displacement from current block 1700 to a position of a reference block within IBC reference region 1706. The position of the reference block may be determined by the position of the top left sample of the reference block. Thus, BVP 1712 may not accurately predict BV 1708 because BVP 1712 indicates a relative displacement from current block 1700 to sample position 1716 that is outside IBC reference region 1706. Embodiments of the present disclosure may adjust BVPs, such as BVP 1716, to more accurately predict a BV.

In an embodiment, the encoder or decoder of FIG. 17 may determine whether a coordinate (e.g., a horizontal (x) or vertical (y) coordinate) of sample position 1716 is outside a range of values of the coordinate for samples in IBC reference region 1706. For example, the encoder or decoder may determine whether an x-coordinate of sample position 1716 is outside the range of values $x_0$-$x_1$, which is the range of values of the x-coordinate for samples in IBC reference region 1706 as shown in FIG. 17. In an embodiment, the encoder or decoder may determine whether an x-coordinate of sample position 1716 is less than the lower bound $x_0$ of the range of values $x_0$-$x_1$, and/or whether an x-coordinate of sample position 1716 is greater than the upper bound xi of the range of values $x_0$-$x_1$. In another embodiment, the encoder or decoder may adjust the upper bound $x_1$ of the range of values $x_0$-$x_1$ based on a width of current block 1700 before making such a comparison. This adjustment may be made where BV 1708 is constrained to indicate a reference block entirely within the bounds of IBC reference region 1706. The new upper bound $x'_1$ may be equal to $x_1$ less the width of current block 1700.

In another example, the encoder or decoder may determine whether a y-coordinate of sample position 1716 is outside the range of values $y_0$-$y_1$, which is the range of values of the y-coordinate for samples in IBC reference region 1706 as shown in FIG. 17. In an embodiment, the encoder or decoder may determine whether a y-coordinate of sample position 1716 is less than the lower bound $y_0$ of the range of values $y_0$-$y_1$, and/or whether a y-coordinate of sample position 1716 is greater than the upper bound $y_1$ of the range of values $y_0$-$y_1$. In another embodiment, the encoder or decoder may adjust the upper bound $y_1$ of the range of values $y_0$-$y_1$ based on a height of current block 1700 before making such a comparison. This adjustment may be made where BV 1708 is constrained to indicate a reference block entirely within the bounds of IBC reference region 1706. The new upper bound $y'_1$ may be equal to $y_1$ less the height of current block 1700.

In an embodiment, based on determining a coordinate of sample position 1716 is outside a range of values of the coordinate for samples in IBC reference region 1706, the encoder or decoder may adjust a length of a component, corresponding to the coordinate, of BVP 1712. For example, the encoder or decoder may adjust the length of the component to have a value equal or closer to the length of the distance from current block 1700 (e.g., from the upper left sample of current block 1700) to an upper or lower bound of the range of values of the coordinate for the samples in reference region 1716. In an embodiment, the encoder or decoder may adjust the length of the component to have a value equal or closer to the length of the distance from current block 1700 to the upper bound of the range of values based on the coordinate of sample position 1716 being greater than the upper bound of the range of values. In an embodiment, the encoder or decoder may adjust the length of the component to have a value equal or closer to the length of the distance from current block 1700 to the lower bound of the range of values based on the coordinate of sample position 1716 being less than the lower bound of the range of values. In an embodiment, both the horizontal and vertical component of BVP 1712 may be adjusted based on the above.

In an embodiment, the encoder or decoder may use BVP 1712, with the adjusted component, to predict (in the case of encoder) or determine (in the case of decoder) BV 1708 in the same manner as explained above with respect to BVP 1712 without the adjusted component. In an embodiment, the encoder may perform the method discussed above for each BVP candidate in a list of BVP candidates or each BVP candidate added to a list of BVP candidates. After adjusting one or more of the BVP candidates in the list of BVP candidates, the encoder may then select one of the BVP candidates to predict the BV. In an embodiment, the decoder may perform the method discussed above for the selected BVP indicated by the encoder in a bitstream to predict the BV. After adjusting the selected BVP, the decoder may the determine the BV by adding the BVP to the BVD, which may have been further indicated by the encoder in the bitstream, in the case of AMVP or simply use the BVP as the BV in the case of merge mode.

Figure 18:
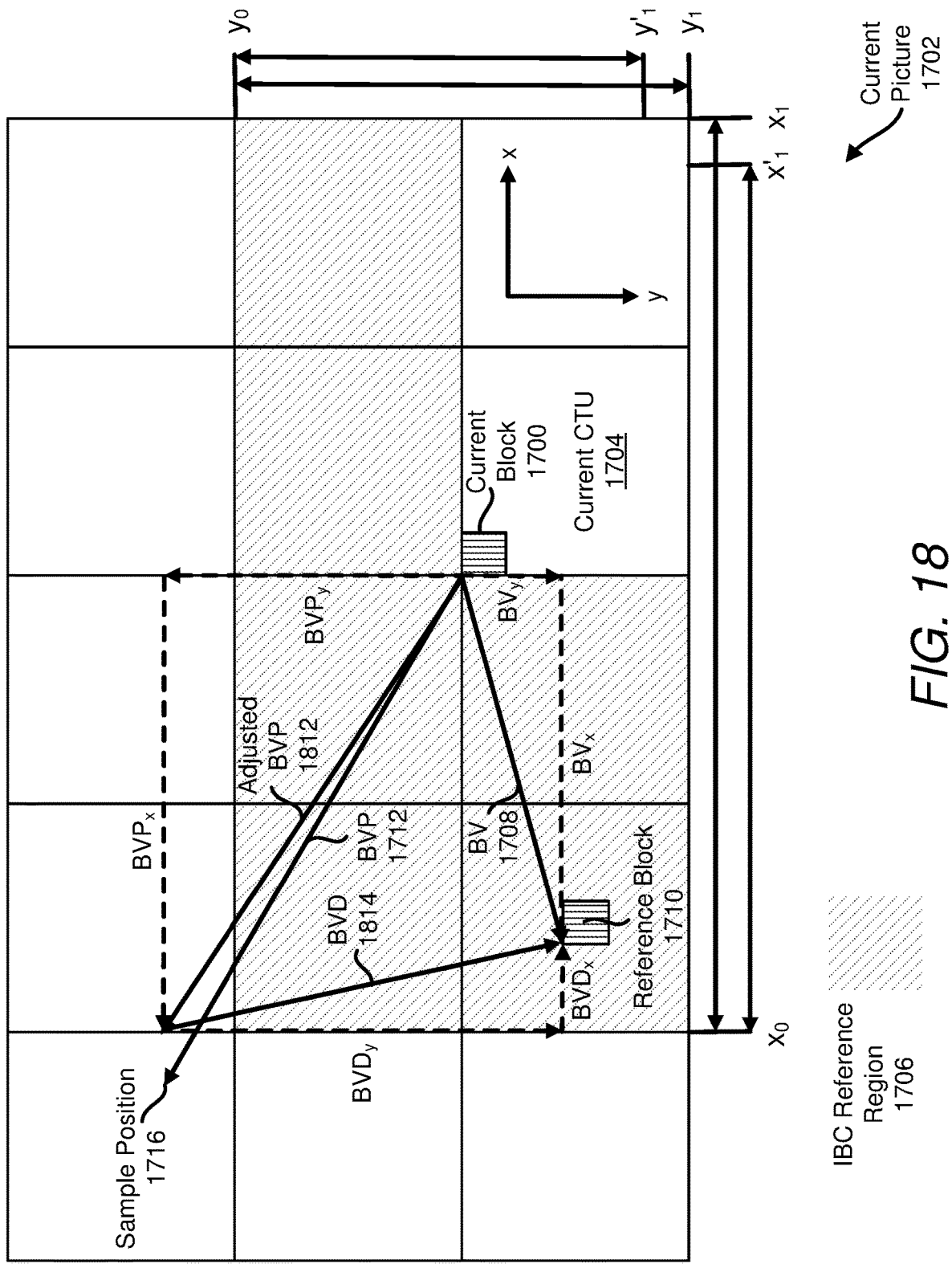
FIG. 18 illustrates an adjustment to a BVP in accordance with embodiments of the present disclosure.

Continuing with the example of FIG. 17, FIG. 18 illustrates an adjustment to BVP 1712 that was made in the manner discussed above with respect to FIG. 17. More specifically, based on determining the x-coordinate of sample position 1716 is less than the lower bound of the range of values $x_0$-$x_1$ (or the range of values $x_0$-$x'_1$) of the x-coordinate for samples in IBC reference region 1706, the encoder or decoder adjusts the x-component of BVP 1712 to have a value closer to the length of the distance from current block 1700 to the lower bound $x_0$ of the range of values of the x-coordinate for samples in IBC reference region 1706. In the case of FIG. 18, the encoder or decoder adjusts the x-component of BVP 1712 to have a value equal to the length of the distance from current block 1700 to the lower bound $x_0$ of the range of values of the x-coordinate for samples in IBC reference region 1706. The result of this adjustment to BVP 1712 is adjusted BVP 1812. As can be seen from FIG. 18, adjusted BVP 1812 provides a better prediction of BV 1708 by reducing the length of the horizontal component $BVD_x$ of BVD 1814 compared to the horizontal component of $BVD_x$ of BVD 1714 in FIG. 17.

Figure 19:
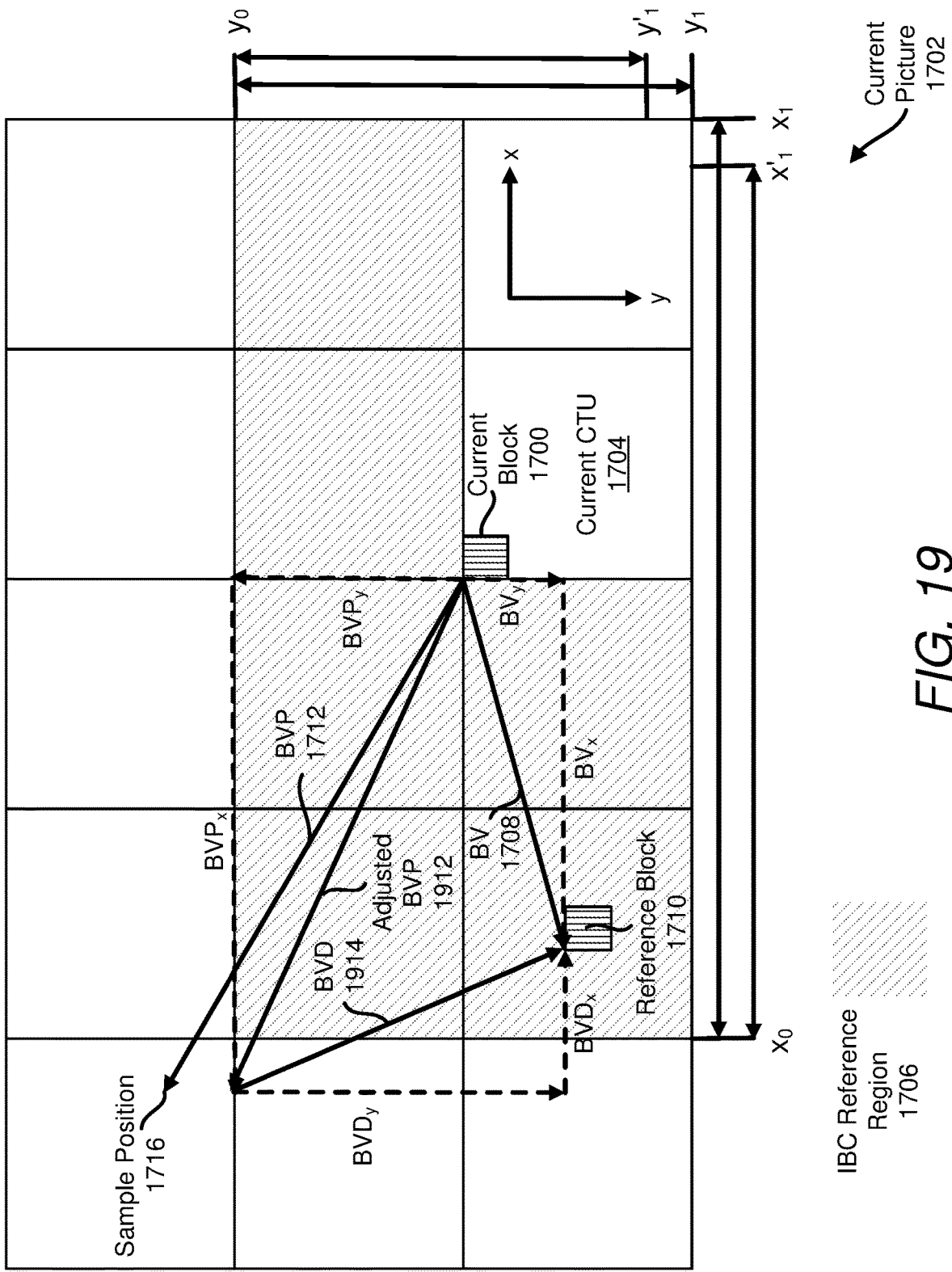
FIG. 19 illustrates another adjustment to a BVP in accordance with embodiments of the present disclosure.

Continuing with the example of FIG. 17, FIG. 19 illustrates another adjustment to BVP 1712 that was made in the manner discussed above with respect to FIG. 17. More specifically, based on determining the y-coordinate of sample position 1716 is less than the lower bound of the range of values $y_0$-$y_1$ (or the range of values $y_0$-$y'_1$) of the y-coordinate for samples in IBC reference region 1706, the encoder or decoder adjusts the y-component of BVP 1712 to have a value closer to the length of the distance from current block 1700 to the lower bound $y_0$ of the range of values of the y-coordinate for samples in IBC reference region 1706. In the case of FIG. 19, the encoder or decoder adjusts the y-component of BVP 1712 to have a value equal to the length of the distance from current block 1700 to the lower bound $y_0$ of the range of values of the y-coordinate for samples in IBC reference region 1706. The result of this adjustment to BVP 1712 is adjusted BVP 1912. As can be seen from FIG. 19, adjusted BVP 1912 provides a better prediction of BV 1708 by reducing the length of the vertical component $BVD_y$ of BVD 1914 compared to the vertical component $BVD_y$ of BVD 1714 in FIG. 17.

Figure 20:
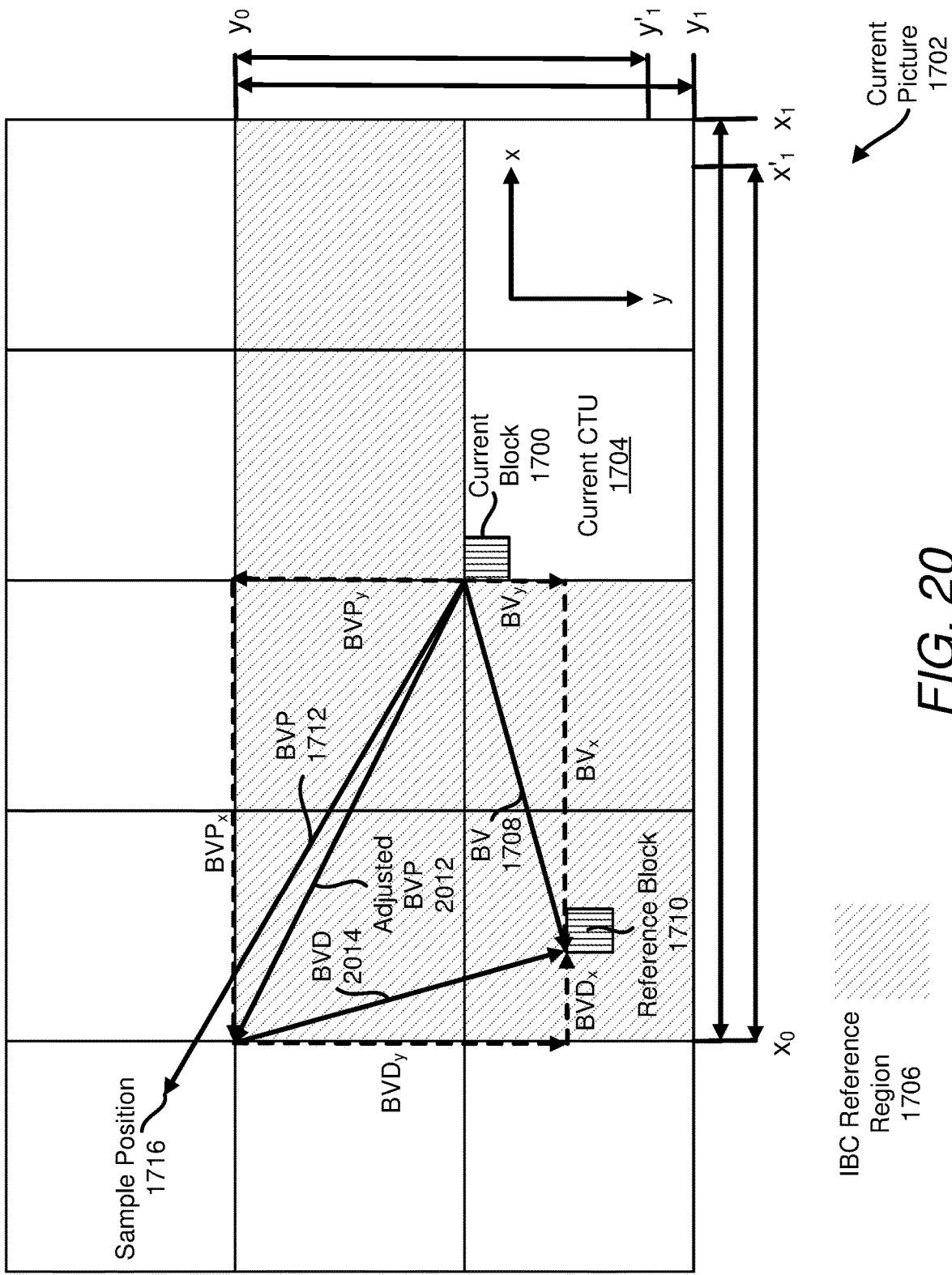
FIG. 20 illustrates another adjustment to a BVP in accordance with embodiments of the present disclosure.

Continuing with the example of FIG. 17, FIG. 20 illustrates another adjustment to BVP 1712 that was made in the manner discussed above with respect to FIG. 17. More specifically, based on determining the x-coordinate of sample position 1716 is less than the lower bound of the range of values $x_0-x_1$ (or the range of values $x_0-x'_1$) of the x-coordinate for samples in IBC reference region 1706, the encoder or decoder adjusts the x-component of BVP 1712 to have a value equal to the length of the distance from current block 1700 to the lower bound $x_0$ of the range of values of the x-coordinate for samples in IBC reference region 1706. In addition, based on determining the y-coordinate of sample position 1716 is less than the lower bound of the range of values $y_0-y_1$ (or the range of values $y_0-y'_1$) of the y-coordinate for samples in IBC reference region 1706, the encoder or decoder adjusts the y-component of BVP 1712 have a value equal to the length of the distance from current block 1700 to the lower bound $y_0$ of the range of values of the y-coordinate for samples in IBC reference region 1706. The result of these adjustments to BVP 1712 is adjusted BVP 2012. As can be seen from FIG. 20, adjusted BVP 2012 provides a better prediction of BV 1708 by reducing the length of both the horizontal and vertical components of BVD 2014 compared to the horizontal and vertical components of BVD 1714 in FIG. 17.

In the examples of FIGS. 17-20, IBC reference region 1706 was provided by way of example and not limitation. In other embodiments, the methods discussed above with respect to FIGS. 17-20 may be applied based on IBC reference regions different than IBC reference region 1706 as would be appreciated by persons of ordinary skill in the art based on the teachings herein. For example, IBC reference region 1706 may be replaced by an IBC reference region that approximates a true IBC reference region, such as IBC reference 1706. An approximate IBC reference region may entirely encompass a true IBC reference region (i.e., an actual IBC reference region). For example, an approximate IBC reference region may be used for the methods discussed above with respect to FIGS. 17-20. The approximate IBC reference region may be rectangular in shape and entirely encompass IBC reference region 1706. An approximate IBC reference region may help to simplify the determination of whether a BVP candidate indicates a displacement from a current block to a sample (or reference block) within an IBC reference region. This is particularly the case for true IBC reference regions with complex shapes that are dependent on a number of factors, such as those described further below with respect to FIGS. 21-23.

In another example, IBC reference region 1706 in the examples of FIGS. 17-20 may be replaced by an IBC reference region determined based on a different set of IBC reference region constraints. For example, in addition to being constrained to a reconstructed part of current picture 1702 and potentially to a particular wavefront parallel processing (WPP) partition or tile partition as mentioned above with respect to FIG. 17, IBC reference region 1706 may be further constrained to include a number of decoded or reconstructed samples that may be stored in a limited size IBC reference sample memory. The size of the IBC reference sample memory may be limited based on being implemented on-chip with the encoder or decoder. The IBC reference region may be increased in size by using a larger size IBC reference sample memory off-chip from the encoder or decoder; however, such an approach may have its own drawbacks, such as increased off-chip memory bandwidth requirements and increased delay in writing and reading samples in the IBC reference region to and from the IBC reference sample memory.

In an embodiment, with a limited size IBC reference sample memory, the IBC reference region may be constrained to: a reconstructed part of the current CTU; and one or more reconstructed CTUs to the left of the current CTU not including a portion, of a left most one of the one or more reconstructed CTUs, collocated with either the reconstructed part of the current CTU or a virtual pipeline data unit (VPDU) in which the current block being coded is located. Blocks of samples in different CTUs may be collocated based on having a same size and CTU offset. A CTU offset of a block may be the offset of the block's top-left corner relative to the top-left corner of the CTU in which the block is located.

The IBC reference region may not include the portion, of the left most one of the more reconstructed CTUs, that is collocated with the reconstructed part of the current CTU because the IBC reference sample memory may be implemented similar to a circular buffer. For example, the IBC reference sample memory may store reconstructed reference samples corresponding to one or more CTUs. Once the IBC reference sample memory is filled, reconstructed reference samples of the current CTU may replace the reconstructed reference samples of a CTU stored in the IBC reference sample memory that are located, within a picture or frame, farthest to the left of the current CTU. The samples of the CTU stored in the IBC reference sample memory that are located, within a picture or frame, farthest to the left of the current CTU may correspond to the oldest data in the IBC reference sample memory. This update mechanism allows some of the reconstructed reference samples from the left most CTU to remain stored in the IBC reference sample memory when processing the current CTU. The remaining reference samples of the left most CTU stored in the IBC reference sample memory may then be used for predicting the current block in the current CTU.

In addition, in typical hardware implementations of an encoder or decoder, a CTU may not be processed all at once. Instead, the CTU may be divided into VPDUs for processing by a pipeline stage. A VPDU may comprise a 4×4 region of samples, a 16×16 region of samples, a 32×32 region of samples, a 64×64 region of samples, a 128×128 region of samples, or some other sample region size. In an embodiment, a size of a VPDU may be determined based on a minimum of a maximum VPDU size (e.g., a 64×64 region of samples) and a size (e.g., a width or height) of a current CTU. The portion, of the left most one of the one or more reconstructed CTUs, that is collocated with the VPDU in which the block being coded is located may be further excluded from the IBC reference region as mentioned above. By excluding this region of the left most one of the one or more reconstructed CTUs from the IBC reference region, the corresponding portion of the IBC reference sample memory used to store reconstructed reference samples from this region may be used to store only samples within the region of the current CTU corresponding to the VPDU, which may avoid certain complexities in design.

The number of reconstructed CTUs to the left of the current CTU included in the IBC reference region may be determined based on the number of reconstructed reference samples the IBC reference sample memory may store and the size of the CTUs in the current picture. For example, the number of reconstructed CTUs to the left of the current CTU included in the IBC reference region may be determined based on the number of reconstructed reference samples the IBC reference sample memory may store divided by the size of a CTU in the current picture. Thus, for an IBC reference sample memory that may store 128×128 reconstructed reference samples for the IBC reference region and a CTU size of 128×128 samples, the number of reconstructed CTUs to the left of the current CTU included in the IBC reference region may be equal to (128×128)/(128×128) or 1 CTU. In another example, for a memory that may store 128×128 reconstructed reference samples for the IBC reference region and a CTU size of 64×64 samples, the number of reconstructed CTUs to the left of the current CTU included in the IBC reference region may be equal to (128×128)/(64×64) or 4 CTUs.

Figure 21A:
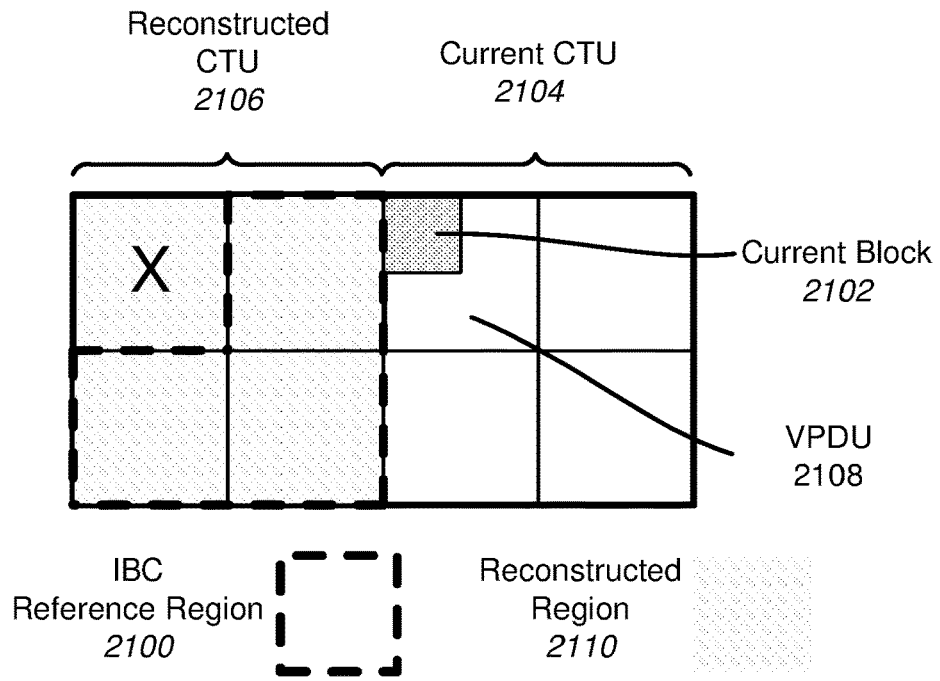
FIG. 21A illustrates an example IBC reference region determined based on an IBC reference sample memory size of 128×128 samples and a CTU size of 128×128 samples in accordance with embodiments of the present disclosure.

FIG. 21A illustrates an example IBC reference region 2100 determined based on an IBC reference sample memory size of 128×128 samples and a CTU size of 128×128 samples in accordance with embodiments of the present disclosure. Based on the IBC reference sample memory size of 128×128 samples and a CTU size of 128×128 samples, the number of reconstructed CTUs to the left of the current CTU included in the IBC reference region may be equal to (128×128)/(128×128) or 1 CTU.

FIG. 21A illustrates a current block 2102 within a current CTU 2104. Current block 2102 is the first block coded in current CTU 2104 and is coded using IBC mode. As described above with respect to FIG. 17, a block is coded using IBC mode by determining a "best matching" reference block within an IBC reference region. In FIG. 21A, IBC reference region 2100 is be constrained to: a reconstructed part of current CTU 2104; and the single, reconstructed CTU 2106 to the left of current CTU 2104 not including a portion, of reconstructed CTU 2106, collocated with either the reconstructed part of current CTU 2104 or a virtual pipeline data unit (VPDU) 2108 in which current block 2102 is located. In the example of FIG. 21A, CTUs are divided into 4 VPDUs of size 64×64 samples. Accordingly, IBC reference region 2100 for current block 2102 includes reconstructed region 2110 (shown with hatching) except the 64×64 region of reconstructed CTU 2106 collocated with VPDU 2108. This collocated region is marked with an "X" in FIG. 21A. It should be noted that, for different size CTUs, the IBC reference region in FIG. 21A may include a different number of CTUs to the left of current CTU 2102 than the single, reconstructed CTU 2106. For example, for CTU sizes of 64×64, the IBC reference region may include 4 CTUs to the left of current CTU 2102 based on the number of reconstructed reference samples the IBC reference sample memory may store divided by the size of the CTUs in the current picture.

Figure 21B:
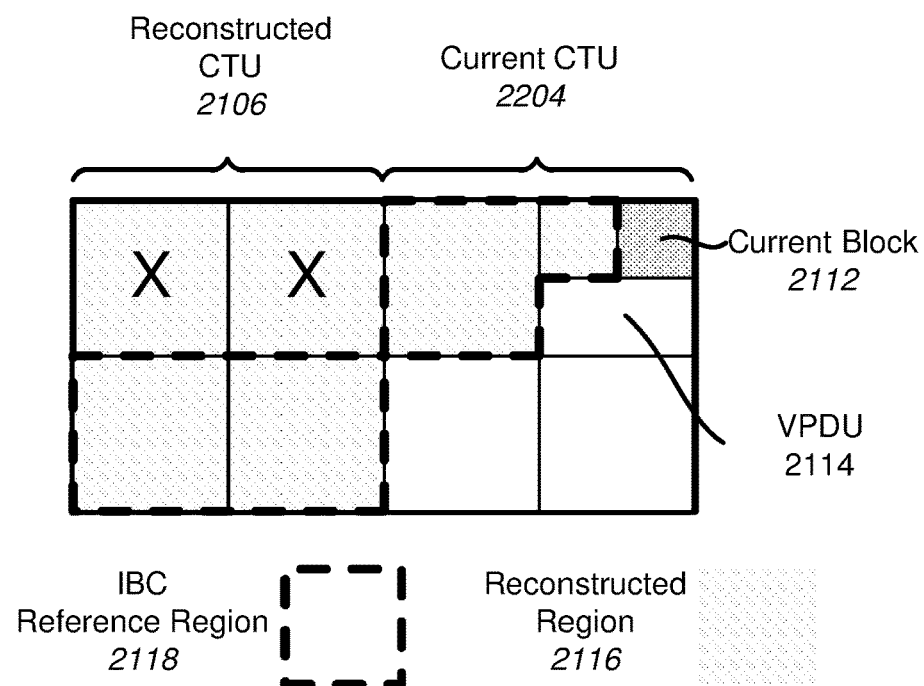
FIG. 21B illustrates another example IBC reference region determined based on an IBC reference sample memory size of 128×128 samples and a CTU size of 128×128 samples in accordance with embodiments of the present disclosure.

FIG. 21B continues with the example of FIG. 21A for a later coded block in current CTU 2104 in accordance with embodiments of the present disclosure. The later coded block is labeled as current block 2112 in FIG. 21B and is coded using IBC mode, as described above with respect to FIG. 17, by determining a "best matching" reference block within an IBC reference region. IBC reference region 2118 for current block 2112 may be constrained to: a reconstructed part of current CTU 2104; and the reconstructed CTU 2106 not including a portion, of reconstructed CTU 2106, collocated with either the reconstructed part of current CTU 2104 or a virtual pipeline data unit (VPDU) 2114 in which current block 2112 is located. As mentioned above with respect to FIG. 21A, current CTU 2104 is divided into 4 VPDUs of size 64×64 samples. Accordingly, IBC reference region 2118 in FIG. 21B for current block 2112 includes reconstructed region 2116 (shown with hatching) except the part of CTU 2106 collocated with either the reconstructed part of current CTU 2104 or VPDU 2114. These collocated regions are each marked with an "X" in FIG. 21B.

Figure 22A:
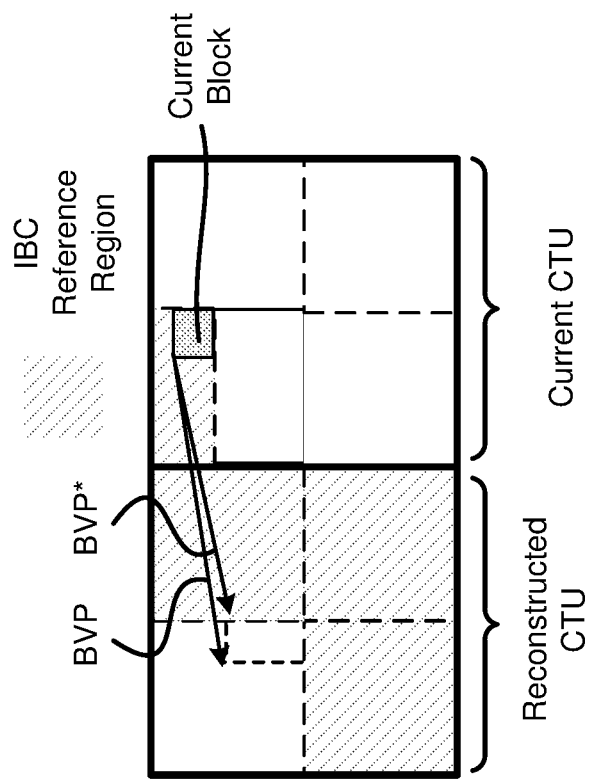
FIG. 22A an adjustment to a BVP in accordance with embodiments of the present disclosure.
Figure 22B:
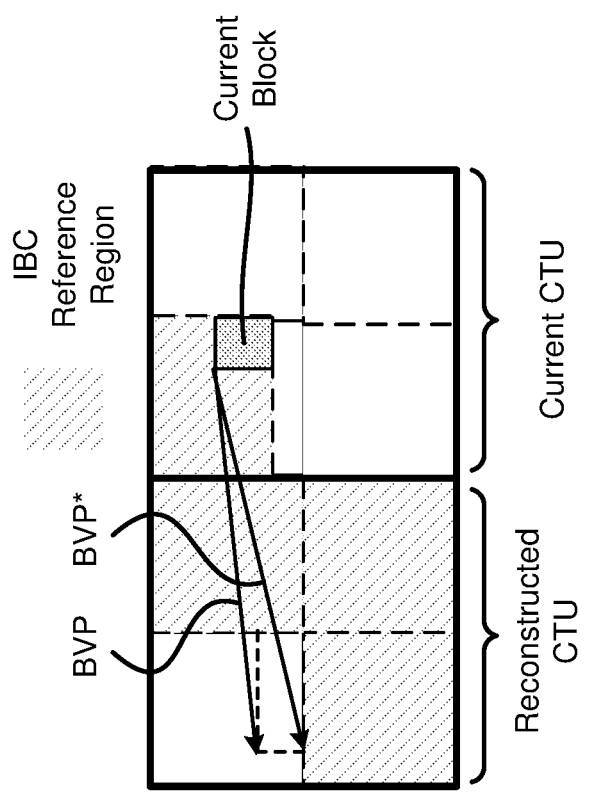
FIG. 22B another adjustment to a BVP in accordance with embodiments of the present disclosure.

When the CTU size is 128×128, the left boundary of the IBC reference region in the left CTU may be different for the top row of VPDUs versus the bottom row of VPDUs as shown in FIGS. 22A and 22B. When a current block is in the top-left VPDU of the current CTU and the BVP points to the top VPDU row in the left reconstructed CTU, the left edge of the IBC reference region is the left edge of the top right VDPU in the reconstructed CTU. Otherwise, the BVP points to the bottom VPDU row in the left reconstructed CTU and the left boundary is the left edge of the left reconstructed CTU. In the case that the BVP points into the top-left VPDU of the left reconstructed CTU, an encoder or decoder may adjust the horizontal and vertical components of the BVP based on a minimum distance from the BVP to the right and bottom edges of the VPDU. If the orthogonal distance between the BVP and bottom edge of the neighbor VPDU is less than the orthogonal distance between the BVP and the right edge of the VPDU, an encoder or decoder may down-shift the BVP to point to the bottom edge of the VPDU. Otherwise, an encoder or decoder may crop the horizontal BVP to the right VPDU edge. FIGS. 22A and 22B show both examples where the BVP is down-shifted and horizontally cropped, respectively. The down-shifted and horizontally cropped BVPs are denoted by BVP* in each of FIGS. 22A and 22B. In an embodiment, the encoder or decoder may use the down-shifted or horizontally cropped BVP, to predict (in the case of encoder) or determine (in the case of decoder) a BV in the same manner as explained above with respect to BVP 1712 of FIG. 17 without the adjusted component.

Figure 23B:
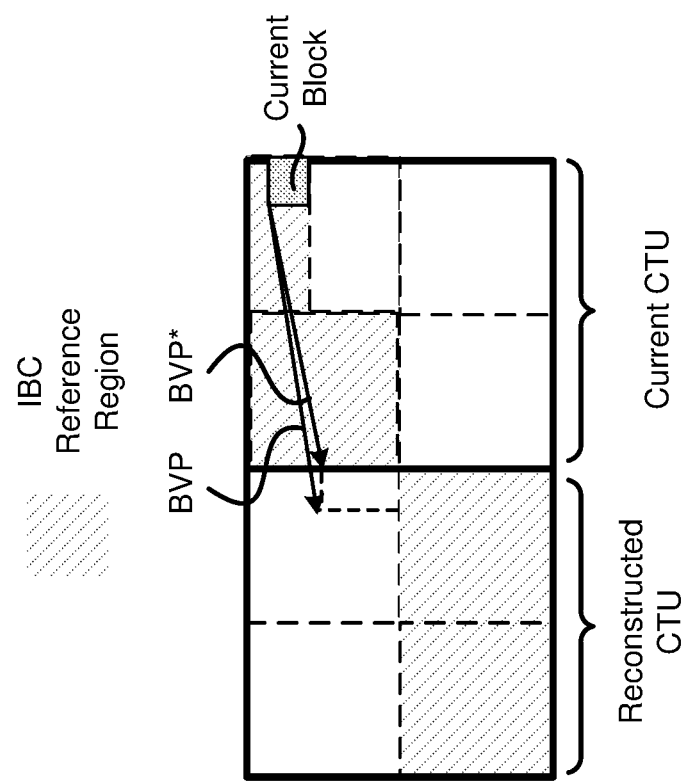
FIG. 23B another adjustment to a BVP in accordance with embodiments of the present disclosure.
Figure 23A:
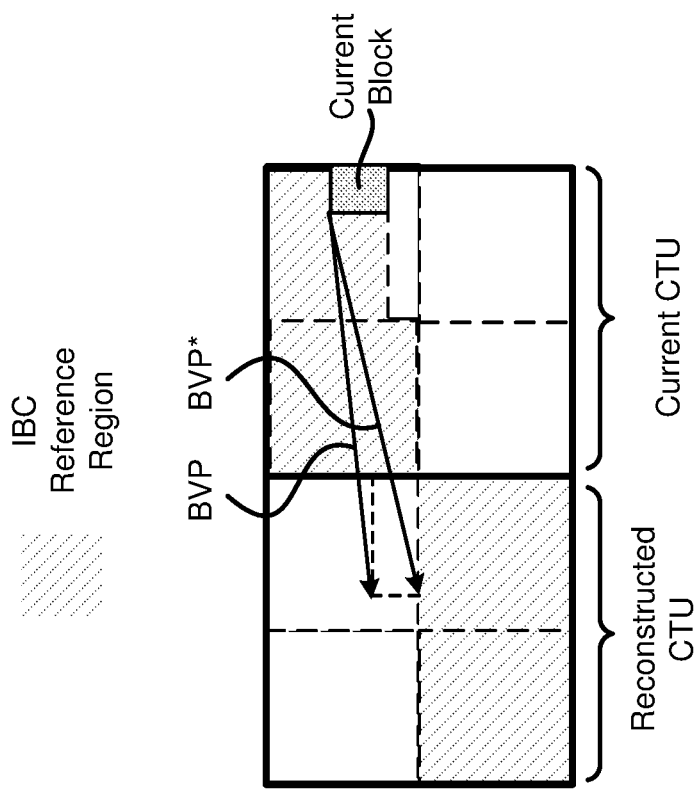
FIG. 23A an adjustment to a BVP in accordance with embodiments of the present disclosure.

When the CTU size is 128×128, the left boundary of the IBC reference region in the left CTU may be further different for the top row of VPDUs versus the bottom row of VPDUs as shown in FIGS. 23A and 23B. When a current block is in the top-right VPDU of the current CTU and the BVP points to the top VPDU row in the left reconstructed CTU, the left edge of the IBC reference region is the right edge of the reconstructed CTU. Otherwise, the BVP points to the bottom VPDU row in the left reconstructed CTU and the left boundary is the left edge of the left reconstructed CTU. In the case that the BVP points into the top row of VPDUs of the left reconstructed CTU, an encoder or decoder may adjust the horizontal and vertical components of the BVP based on a minimum distance from the BVP to the right edge of the reconstructed CTU and bottom edges of the VPDUs in the top row of VPDUs. If the orthogonal distance between the BVP and bottom edges of the VPDUs in the top row of VPDUs is less than the orthogonal distance between the BVP and the right edge of the reconstructed CTU, an encoder or decoder may down-shift the BVP to point to the bottom edges of the VPDUs in the top row of VPDUs. Otherwise, an encoder or decoder may crop the horizontal BVP to the right edge of the reconstructed CTU. FIGS. 23A and 23B show both examples where the BVP is down-shifted and horizontally cropped, respectively. The down-shifted and horizontally cropped BVPs are denoted by BVP* in each of FIGS. 23A and 23B. In an embodiment, the encoder or decoder may use the down-shifted or horizontally cropped BVP, to predict (in the case of encoder) or determine (in the case of decoder) a BV in the same manner as explained above with respect to BVP 1712 of FIG. 17.

Figure 24:
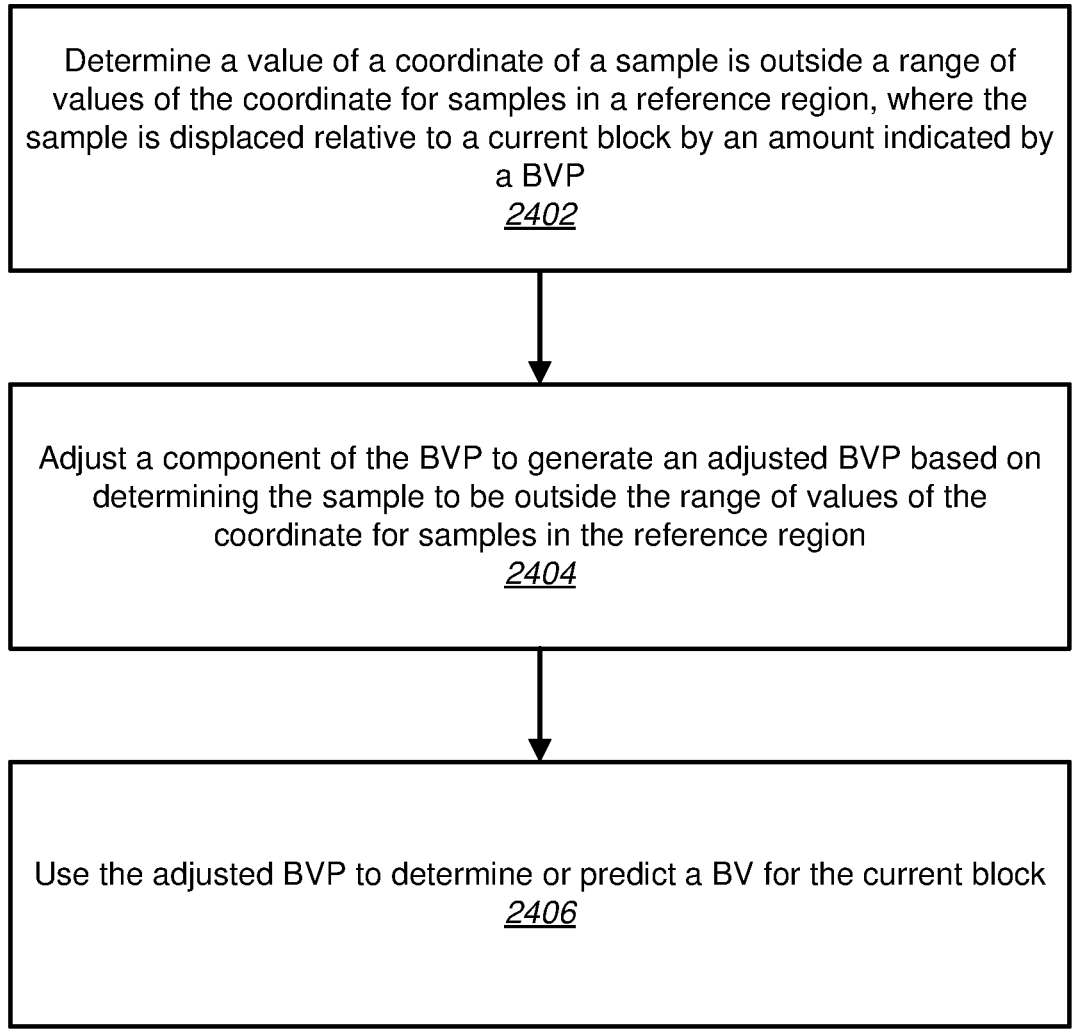
FIG. 24 illustrates a flowchart of a method for adjusting a component of a BVP in accordance with embodiments of the present disclosure.

FIG. 24 illustrates a flowchart 2400 of a method for adjusting a component of a BVP in accordance with embodiments of the present disclosure. The method of flowchart

2400 may be implemented by an encoder or decoder, such as encoder 200 in FIG. 2 or decoder 300 in FIG. 3.

The method of flowchart 2400 begins at 2402. At 2402, a value of a coordinate for a sample is determined to be outside a range of values of the coordinate for samples in an IBC reference region (e.g., an approximate or true reference region). The sample is displaced relative to a current block being encoded or decoded, using IBC, by an amount indicated by the BVP. In an embodiment, an upper bound of the range of values of the coordinate is adjusted based on a width or height of the current block.

At 2404, a component of the BVP is adjusted to generate an adjusted BVP based on determining the sample to be outside the range of values of the coordinate for samples in the reference region. The component of the BVP may be adjusted to have a length equal (or at least closer) to the length of the distance from the current block to a bound of the range of values of the coordinate for the samples in the IBC reference region. In an embodiment, the component of the BVP may be adjusted to have a value equal or closer to the length of the distance from current block to the upper bound of the range of values based on the coordinate of the sample position being greater than the upper bound of the range of values. In an embodiment, the component may be adjusted to have a value equal or closer to the length of the distance from the current block to the lower bound of the range of values based on the coordinate of the sample position being less than the lower bound of the range of values. In one embodiment, the coordinate is a horizontal coordinate (x-coordinate) and the component is a horizontal component. In another embodiment, the coordinate is a vertical coordinate (y-coordinate) and the component is a vertical component.

At 2406, the BVP, with the component adjusted to have the adjusted value, is used to determine (in case of the encoder) or predict (in case of the decoder) a BV for the current block.

As discussed above, for BV prediction and difference coding (or AMVP for IBC), an encoder, such as encoder 200 in FIG. 2, may code a BV as a difference between the BV of a current block being coded and a BV predictor (BVP). An encoder may select the BVP from a list of candidate BVPs. The list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC may be the same as those shown in FIG. 15A for inter prediction. The five spatial candidate neighboring blocks are respectively denoted $A_0$, $A_1$, $B_0$, $B_1$, and $B_2$. The decoder may construct the same list of candidate BVPs as the encoder for decoding the BV as explained above.

As further discussed above, an encoder, such as encoder 200 in FIG. 2, may further code a BV using merge mode. Using merge mode, the encoder may reuse the same BV of, for example, a neighboring block for IBC prediction of a current block. Because the same BV of a neighboring block is used, no BVD needs to be signaled and the signaling overhead for signaling the BV of the current block may be small in size. The list of candidate BVPs for merge mode may comprise up to four spatial merge candidates that are derived from the five spatial neighboring blocks used in AMVP for IBC, one temporal merge candidate derived from two temporal, co-located blocks used in AMVP for IBC, and one or more additional merge candidates including zero motion vector candidates. The decoder may construct the same list of candidate BVPs as the encoder for decoding the BV as explained above.

When an encoder or decoder constructs the list of candidate BVPs for either BV prediction and difference coding (or AMVP for IBC) or merge mode, the candidate BVPs are generally added to the list of candidate BVPs based on a predetermined order. For example, the encoder and decoder may first add candidate BVPs to the candidate BVP list for merge mode based on the spatial neighbors as shown in FIG. 15A. For example, one candidate BVP may be added to the candidate BVP list from A0 and A1 and one from B0, B1, and B2, respectively in that order. In another example, up to four BVP candidates may be added to list of candidate BVPs by sequentially checking A1, B1, B0, A0, and B2 in that order. The encoder and decoder may add one or more temporal candidate BVPs to the list of candidate BVPs when there are not enough spatial candidate BVPs available (e.g., because they are coded in intra or inter mode) or they are identical. The encoder and decoder may add one or more zero motion vectors to the list of candidate BVPs when the spatial, temporal, or both types of candidate BVPs are not available.

The predetermined order in which the encoder and decoder add candidate BVPs to the list of candidate BVPs for either BV prediction and difference coding (or AMVP for IBC) or merge mode may be designed to place the candidate BVPs in the list in order of their probability of being selected as the BVP for predicting the BV of the current block being coded. The most probable candidate BVP may be placed first in the list of candidate BVPs, the second most probable candidate BVP may be placed second in the list, and so on. By placing the candidate BVPs in the list in order of their probabilities, entropy encoding of the indexes of the list may be more effective. For example, assuming the order of the candidate BVPs in the list is actually in descending order of their respective probabilities, shorter length codewords may be assigned to the indexes of candidate BVPs at the beginning of the list that are more likely to be selected and longer codewords may be assigned to the indexes of candidate BVPs at the end of the list that are less likely to be selected. In this way, less bits may be required for an encoder to signal selected BVPs from lists of candidate BVPs to a decoder. The problem with the predetermined order used in many implementations for adding candidate BVPs to the list of candidate BVPs is that the predetermined order may not accurately reflect the probabilities of the candidate BVPs of being selected as the BVP for predicting the BV of the current block being coded.

To improve the ordering of candidate BVPs in the list of candidate BVPs, adaptive reordering mechanisms have been introduced based on cost values determined for one or more candidate BVPs. After constructing a list of candidate BVPs, a cost of one or more of the candidate BVPs in the list of candidate BVPs may be determined or derived and then the candidate BVPs in the list of candidate BVPs may be reordered based on their associated cost values.

Figure 25:
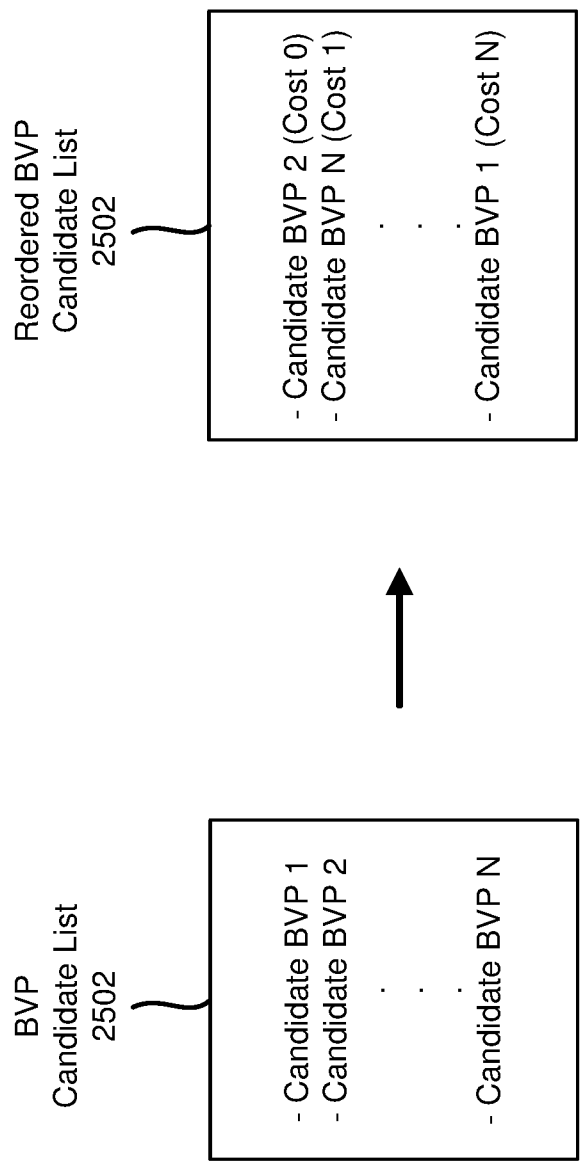
FIG. 25 illustrates an example adaptive reordering of candidate BVPs in accordance with embodiments of the present disclosure.

FIG. 25 illustrates an example adaptive reordering of candidate BVPs in accordance with embodiments of the present disclosure. In the example of FIG. 25, an initial BVP candidate list 2502 is constructed. BVP candidate list 2502 may be constructed by an encoder or decoder and may comprise N (N>=2) candidate BVPs added in a predetermined order. In an example, BVP candidate list 2502 may be constructed for either BV prediction and difference coding (or AMVP for IBC) or merge mode for IBC.

After constructed BVP candidate list 2502, a cost value may be determined or derived for one or more of candidate BVPs 1-N. In the example of FIG. 25, a cost value is determined for each of the candidate BVPs in BVP candidate list 2502. In one example, the cost value of a BVP candidate may indicate the likelihood of the BVP candidate being selected by an encoder to predict a BVP used to code a current block. More specifically, the higher the cost value of a BVP candidate, the less likely the BVP candidate will be selected by an encoder to predict a BVP used to code a current block.

After a cost value is determined or derived for one or more of candidate BVPs 1-N of BVP candidate list 2502, the candidate BVPs 1-N in BVP candidate list 2502 may be reordered based on their respective cost values. For example, the candidate BVPs 1-N may be reordered in ascending order based on their respective cost values as shown in FIG. 25. The reordered candidate BVPs 1-N may form a reordered BVP candidate list 2502.

Figure 26:
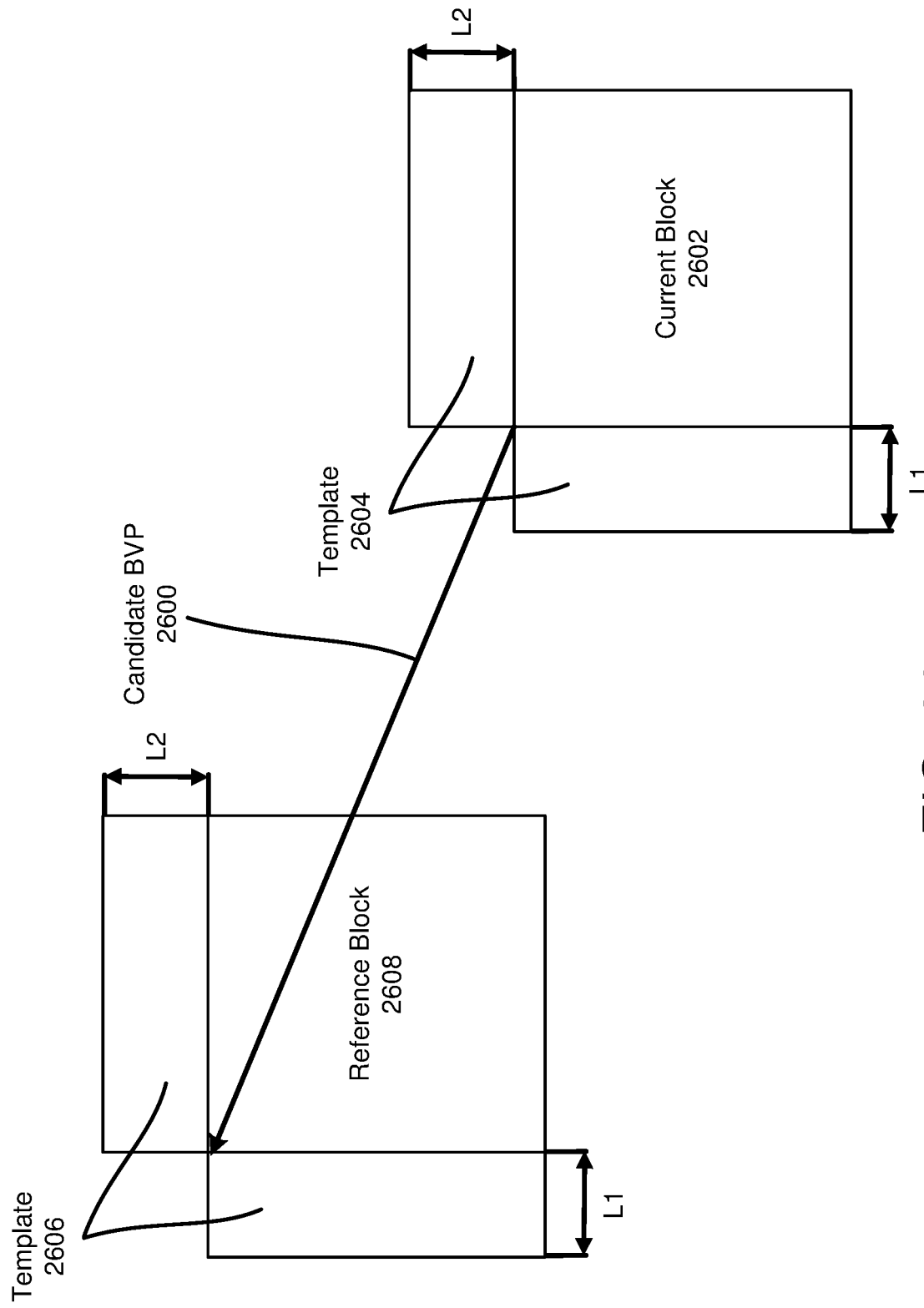
FIG. 26 illustrates an example cost derivation of a candidate BVP in a list of candidate BVPs in accordance with embodiments of the present disclosure.

Referring now to FIG. 26, an example cost derivation of a candidate BVP 2600 in a list of candidate BVPs is illustrated in accordance with embodiments of the present disclosure. The example cost derivation in FIG. 26 may implemented at both an encoder and decoder, such as encoder 200 in FIG. 2 and decoder 300 in FIG. 3, to reorder a list of candidate BVPs as explained above in FIG. 25. Candidate BVP 2600 may be a candidate BVP for predicting a BV used to code a current block 2602 using IBC.

To derive the cost value of candidate BVP 2600, the encoder and decoder may determine a template 2604 comprising reconstructed neighboring samples of current block 2602. Template 2604 may extend to the left and above current block 2602 by L1 and L2 samples, respectively. For example, template 2604 may have a size of L1=L2=2 for current block 2602 of size 4×4 or 8×8 and a size of L1=L2=4 for current block 2602 of size 16×16 or larger.

The encoder and decoder may further determine a template 2606 of a reference block 2608. Reference block 2608 may be determined based on candidate BVP 2600. More specifically, reference block 2608 may be displaced relative to current block 2602 by an amount determined based on candidate BVP 2600 as shown in FIG. 26. For example, the top left sample of reference block 2608 may be displaced from the top left sample of current block 2602 by an amount determined by candidate BVP 2600. The samples in templates 2604 and 2606 may not always come from reconstructed samples. Instead, a reference sample substitution algorithm may be used to determine unavailable samples in templates 2604 and 2606 from available reference samples.

After determining templates 2604 and 2606, the encoder and decoder may then determine a cost value of candidate BVP 2600 based on a difference (e.g., sum of squared differences (SSD), sum of absolute differences (SAD), or sum of absolute transformed differences (SATD)) between the samples of template 2606 and the samples of template 2604. For example, the differences between corresponding samples of templates 2604 and 2606 may be accumulated and the accumulated value may be used to determine a cost value of candidate BVP 2600. For example, the cost value of candidate BVP 2600 may be equal to the accumulated value. The encoder and decoder may use the determined cost value to reorder a position of candidate BVP 2600 in a list of candidate BVPs.

The problem with the adaptive reordering of candidate BVPs in a list of candidate BVPs as described above with respect to FIGS. 25 and 26 is that the reordering may perform better with candidate BVPs that more accurately predict a BV determined using an IBC mode. To improve the adaptive reordering, an encoder or decoder may adjust one or more candidate BVPs as explained above in regard to FIGS. 17-24 before the one or more candidate BVPs are added to a list of candidate BVPs. More specifically, the encoder or decoder may determine whether a coordinate (e.g., a horizontal or vertical coordinate) of a sample, displaced relative to a current block by an amount indicated by the candidate BVP, is outside a range of values of the coordinate for samples in an IBC reference region for the current block. Based on this determination, the encoder or decoder may adjust a length of a component, corresponding to the coordinate, of the candidate BVP to have a value equal or closer to a length of a distance from the current block to a bound of the range of values of the coordinate for the samples in the reference region. The encoder or decoder may then add the adjusted BVP the list of candidate BVPs. The encoder or decoder may then perform adaptive reordering as explained above with respect to FIGS. 25 and 26 on the list of candidate BVPs.

Figure 27:
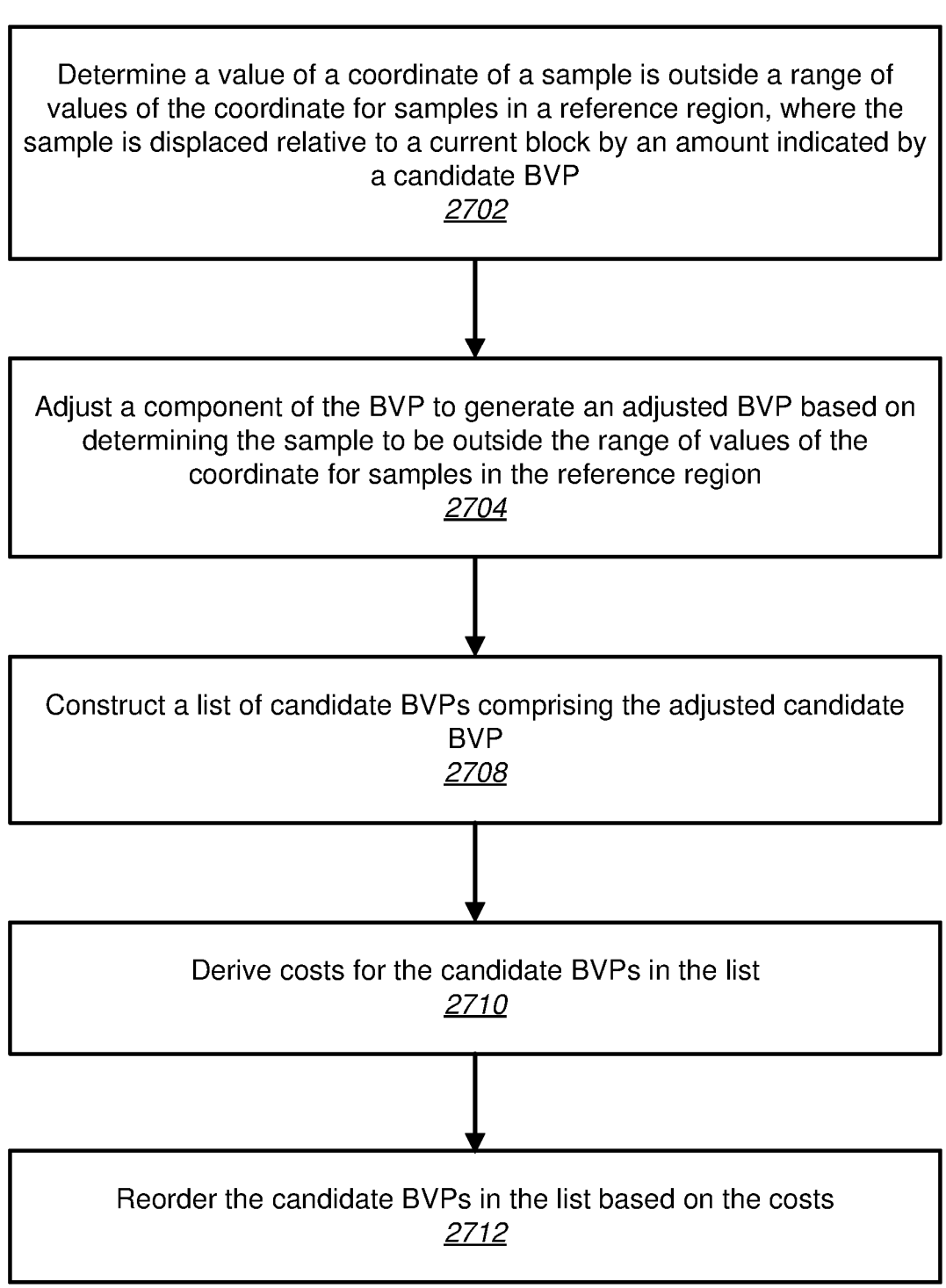
FIG. 27 illustrates a flowchart of a method for adjusting a component of a candidate BVP and reordering a list of candidate BVPs in accordance with embodiments of the present disclosure.

FIG. 27 illustrates a flowchart 2700 of a method for adjusting a component of a candidate BVP and reordering a list of candidate BVPs in accordance with embodiments of the present disclosure. The method of flowchart 2700 may be implemented by an encoder or decoder, such as encoder 200 in FIG. 2 or decoder 300 in FIG. 3.

The method of flowchart 2700 begins at 2702. At 2702, a value of coordinate of a sample is determined to be outside a range of values of the coordinate for samples in an IBC reference region. The sample is displaced relative to a current block by an amount indicated by a candidate BVP.

In an example, the IBC reference region is approximate IBC reference region encompassing a true IBC reference region.

In an example, an upper bound of the range of values of the coordinate is adjusted based on a width or height of the current block.

In an example, the candidate BVP is determined based on one of a neighboring block of the current block or a temporal, co-located block of the current block.

At step 2704, a component of the BVP is adjusted, to generate an adjusted BVP, based on determining the sample to be outside the range of values of the coordinate for samples in the reference region.

In one example, the value of the coordinate of the sample is outside a bound (e.g., one of an upper bound or a lower bound) of the range of values of the coordinate for the sample in the IBC reference region. The length of the component of the candidate BVP may be adjusted to have a value equal or closer to the length of the distance from the current block to the bound of the range of values of the coordinate for the sample in the IBC reference region. In one example, the coordinate is the x-coordinate and the component is the horizontal component. In another example, the coordinate is the y-coordinate and the component is the vertical component.

At 2706, a list of candidate BVPs is constructed comprising the adjusted candidate BVP. In an example, the candidate BVPs are merge candidates for IBV or AMVP candidates for IBC.

At 2708, costs are derived for the candidate BVPs in the list. In an example, a cost of at least one of the candidate BVPs is derived based on differences between a template of the current block and a template of the at least one of the candidate BVPs.

At 2710, the candidate BVPs are reordered in the list based on the costs determined at 2708. In an example, the candidate BVPs are reordered in the list in ascending order based on the costs.

Embodiments of the present disclosure are directed to apparatuses and methods for adjusting a BVP to provide a more accurate prediction of a BV determined using an IBC mode. Embodiments of the present disclosure may determine whether a coordinate (e.g., a horizontal or vertical coordinate) of a sample, displaced relative to a current block by an amount indicated by the BVP, is outside a range of values of the coordinate for samples in a reference region for the current block. Based on this determination, embodiments may adjust a length of a component, corresponding to the coordinate, of the BVP to have a value equal or closer to a length of a distance from the current block to a bound of the range of values of the coordinate for the samples in the reference region. Embodiments may then use the adjusted BVP to determine or predict the BV. These and other features of the present disclosure are described further below.

Figure 28:
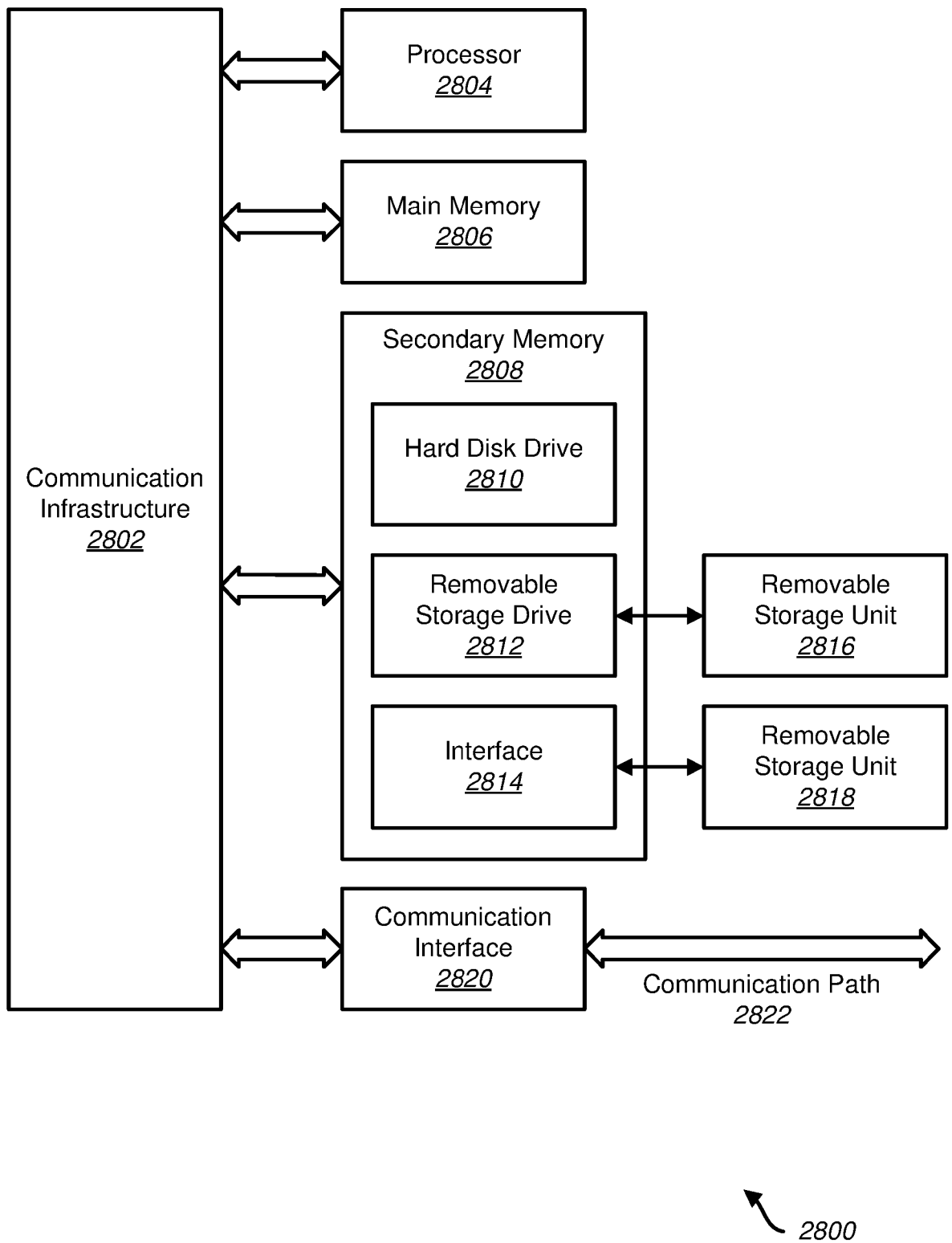
FIG. 28 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2800 is shown in FIG. 28. Blocks depicted in the figures above, such as the blocks in FIGS. 1, 2, and 3, may execute on one or more computer systems 2800. Furthermore, each of the steps of the flowcharts depicted in this disclosure may be implemented on one or more computer systems 2800.

Computer system 2800 includes one or more processors, such as processor 2804. Processor 2804 may be, for example, a special purpose processor, general purpose processor, microprocessor, or digital signal processor. Processor 2804 may be connected to a communication infrastructure 2802 (for example, a bus or network). Computer system 2800 may also include a main memory 2806, such as random access memory (RAM), and may also include a secondary memory 2808.

Secondary memory 2808 may include, for example, a hard disk drive 2810 and/or a removable storage drive 2812, representing a magnetic tape drive, an optical disk drive, or the like. Removable storage drive 2812 may read from and/or write to a removable storage unit 2816 in a well-known manner. Removable storage unit 2816 represents a magnetic tape, optical disk, or the like, which is read by and written to by removable storage drive 2812. As will be appreciated by persons skilled in the relevant art(s), removable storage unit 2816 includes a computer usable storage medium having stored therein computer software and/or data.

In alternative implementations, secondary memory 2808 may include other similar means for allowing computer programs or other instructions to be loaded into computer system 2800. Such means may include, for example, a removable storage unit 2818 and an interface 2814. Examples of such means may include a program cartridge and cartridge interface (such as that found in video game devices), a removable memory chip (such as an EPROM or PROM) and associated socket, a thumb drive and USB port, and other removable storage units 2818 and interfaces 2814 which allow software and data to be transferred from removable storage unit 2818 to computer system 2800.

Computer system 2800 may also include a communications interface 2820. Communications interface 2820 allows software and data to be transferred between computer system 2800 and external devices. Examples of communications interface 2820 may include a modem, a network interface (such as an Ethernet card), a communications port, etc. Software and data transferred via communications interface 2820 are in the form of signals which may be electronic, electromagnetic, optical, or other signals capable of being received by communications interface 2820. These signals are provided to communications interface 2820 via a communications path 2822. Communications path 2822 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2816 and 2818 or a hard disk installed in hard disk drive 2810. These computer program products are means for providing software to computer system 2800. Computer programs (also called computer control logic) may be stored in main memory 2806 and/or secondary memory 2808. Computer programs may also be received via communications interface 2820. Such computer programs, when executed, enable the computer system 2800 to implement the present disclosure as discussed herein. In particular, the computer programs, when executed, enable processor 2804 to implement the processes of the present disclosure, such as any of the methods described herein. Accordingly, such computer programs represent controllers of the computer system 2800.

In another embodiment, features of the disclosure may be implemented in hardware using, for example, hardware components such as ap plication-specific integrated circuits (ASICs) and gate arrays. Implementation of a hardware state machine to perform the functions described herein will also be apparent to persons skilled in the art.

What is claimed is:

1. A method comprising:
  determining a value of a coordinate of a sample is outside a range of values of the coordinate for samples in an intra block copy (IBC) reference region, wherein the sample is displaced from a current block by an amount indicated by a candidate block vector predictor (BVP), wherein the candidate BVP in combination with a block vector difference (BVD) determines a block vector (BV) for the current block, wherein the IBC reference region is neither rectangular nor square and is replaced with a second IBC reference region larger than the IBC reference region and encompassing the IBC reference region, and wherein the determining is based on the second IBC reference region;
  based on the determining, adjusting a component of the candidate BVP to generate an adjusted candidate BVP based on the second IBC reference region;
  constructing an advanced motion vector prediction (AMVP) list of candidate BVPs comprising the adjusted candidate BVP, the AMVP list comprising one or more spatial candidates derived from neighboring blocks of the current block;
  deriving costs for the candidate BVPs in the AMVP list; and
  reordering the candidate BVPs in the AMVP list based on the costs.

2. The method of claim 1, wherein:
the value of the coordinate of the sample is outside a bound of the range of values of the coordinate for the samples in the IBC reference region; and
the adjusting the component of the candidate BVP comprises adjusting a length of the component to have a value equal or closer to a length of a distance from the current block to the bound of the range of values of the coordinate for the samples in the IBC reference region.

3. The method of claim 2, wherein:
the coordinate is an x-coordinate and the component is a horizontal component; or
the coordinate is a y-coordinate and the component is a vertical component.

4. The method of claim 1, wherein an upper bound of the range of values of the coordinate is adjusted based on a width or a height of the current block.

5. The method of claim 1, wherein a cost of one of the candidate BVPs is derived based on differences between a template of the current block and a template of the one of the candidate BVPs.

6. The method of claim 1, wherein the reordering the candidate BVPs in the AMVP list based on the costs comprises reordering the candidate BVPs in an ascending order based on the costs.

7. An apparatus comprising:
one or more processors; and
memory storing instructions that, when executed by the one or more processors, cause the apparatus to:
  determine a value of a coordinate of a sample is outside a range of values of the coordinate for samples in an intra block copy (IBC) reference region, wherein the sample is displaced from a current block by an amount indicated by a candidate block vector predictor (BVP), wherein the candidate BVP in combination with a block vector difference (BVD) determines a block vector (BV) for the current block, wherein the IBC reference region is neither rectangular nor square and is replaced with a second IBC reference region larger than the IBC reference region and encompassing the IBC reference region, and wherein the determining is based on the second IBC reference region;
  based on determining the value of the coordinate of the sample is outside the range of values of the coordinate for the samples in the IBC reference region, adjust a component of the candidate BVP to generate an adjusted candidate BVP based on the second IBC reference region;
  construct an advanced motion vector prediction (AMVP) list of candidate BVPs comprising the adjusted candidate BVP, the AMVP list comprising one or more spatial candidates derived from neighboring blocks of the current block;
  derive costs for the candidate BVPs in the AMVP list; and
  reorder the candidate BVPs in the AMVP list based on the costs.

8. The apparatus of claim 7, wherein:
the value of the coordinate of the sample is outside a bound of the range of values of the coordinate for the samples in the IBC reference region; and
the instructions that, when executed by the one or more processors, cause the apparatus to adjust the component of the candidate BVP further cause the apparatus to adjust a length of the component to have a value equal or closer to a length of a distance from the current block to the bound of the range of values of the coordinate for the samples in the IBC reference region.

9. The apparatus of claim 8, wherein:
the coordinate is an x-coordinate and the component is a horizontal component; or
the coordinate is a y-coordinate and the component is a vertical component.

10. The apparatus of claim 7, wherein an upper bound of the range of values of the coordinate is adjusted based on a width or a height of the current block.

11. The apparatus of claim 7, wherein a cost of one of the candidate BVPs is derived based on differences between a template of the current block and a template of the one of the candidate BVPs.

12. The apparatus of claim 7, wherein the instructions that, when executed by the one or more processors, cause the apparatus to reorder the candidate BVPs in the AMVP list based on the costs further cause the apparatus to reorder the candidate BVPs in an ascending order based on the costs.

13. A non-transitory computer-readable medium storing instructions that, when executed by one or more processors of an apparatus, cause the apparatus to:
  determine a value of a coordinate of a sample is outside a range of values of the coordinate for samples in an intra block copy (IBC) reference region, wherein the sample is displaced from a current block by an amount indicated by a candidate block vector predictor (BVP), wherein the candidate BVP in combination with a block vector difference (BVD) determines a block vector (BV) for the current block, wherein the IBC reference region is neither rectangular nor square and is replaced with a second IBC reference region larger than the IBC reference region and encompassing the IBC reference region, and wherein the determining is based on the second IBC reference region;
  based on determining the value of the coordinate of the sample is outside the range of values of the coordinate for the samples in the IBC reference region, adjust a component of the candidate BVP to generate an adjusted candidate BVP based on the second IBC reference region;
  construct an advanced motion vector prediction (AMVP) list of candidate BVPs comprising the adjusted candidate BVP, the AMVP list comprising one or more spatial candidates derived from neighboring blocks of the current block;
  derive costs for the candidate BVPs in the AMVP list; and
  reorder the candidate BVPs in the AMVP list based on the costs.

14. The non-transitory computer-readable medium of claim 13, wherein:
the value of the coordinate of the sample is outside a bound of the range of values of the coordinate for the samples in the IBC reference region; and
the instructions that, when executed by the one or more processors, cause the apparatus to adjust the component of the candidate BVP further cause the apparatus to adjust a length of the component to have a value equal or closer to a length of a distance from the current block to the bound of the range of values of the coordinate for the samples in the IBC reference region.

15. The non-transitory computer-readable medium of claim 14, wherein:
the coordinate is an x-coordinate and the component is a horizontal component; or
the coordinate is a y-coordinate and the component is a vertical component.

16. The non-transitory computer-readable medium of claim 13, wherein an upper bound of the range of values of the coordinate is adjusted based on a width or a height of the current block.

17. The non-transitory computer-readable medium of claim 13, wherein a cost of one of the candidate BVPs is derived based on differences between a template of the current block and a template of the one of the candidate BVPs.

* * * * *